United States Patent [19]
Yamamoto

[11] Patent Number: 5,145,548
[45] Date of Patent: Sep. 8, 1992

[54] LAMINATING DEVICE FOR USE IN LAMINATING A CONTINUOUS ID CARD MATERIAL

[75] Inventor: Ryoichi Yamamoto, Yao, Japan

[73] Assignee: NATEC Incorporated, Osaka, Japan

[21] Appl. No.: 581,753

[22] Filed: Sep. 13, 1990

[30] Foreign Application Priority Data

Sep. 16, 1989 [JP] Japan .................................. 1-240326
Sep. 16, 1989 [JP] Japan .................................. 1-240327
Sep. 29, 1989 [JP] Japan .................................. 1-255393
Jan. 31, 1990 [JP] Japan .................................. 2-22873

[51] Int. Cl.⁵ .............................................. B32B 31/20
[52] U.S. Cl. .................................. 156/350; 156/323; 156/582; 156/583.5; 100/151; 100/153; 100/154; 100/296
[58] Field of Search ............... 156/311, 312, 323, 582, 156/583.5, 350; 100/151, 153, 154, 296; 264/119, 120

[56] References Cited

U.S. PATENT DOCUMENTS

| | | | |
|---|---|---|---|
| 3,461,581 | 8/1969 | Hoffmann | 40/2.2 |
| 3,567,550 | 3/1971 | Kannegiesser et al. | 156/323 |
| 3,680,476 | 8/1972 | Pfeffer | 100/151 |
| 4,216,179 | 8/1980 | Lamberts et al. | 264/120 |
| 4,406,719 | 9/1983 | Mitsumoto et al. | 156/583.5 |

FOREIGN PATENT DOCUMENTS 0109101 5/1984 European Pat. Off. .
0134820 3/1985 European Pat. Off. .
0249526 12/1987 European Pat. Off. .

Primary Examiner—Caleb Weston
Attorney, Agent, or Firm—Wenderoth, Lind & Ponack

[57] ABSTRACT

A highly efficient manufacture of magnetic cards can be achieved by the arrangement of the present invention in simple and compact structure. The manufacturing apparatus including laminating and cutting devices can automatize every step required for manufacture, e.g., supply, transfer and positioning of material or discharge of a finished card. In other words, the manufacturing arrangement performs the total process automatically from pre-treatment to post-treatment with high efficiency.

3 Claims, 32 Drawing Sheets

LAMINATING DEVICE FOR USE IN LAMINATING A CONTINUOUS ID CARD MATERIAL

BACKGROUND OF THE INVENTION

1. Field of the Invention

The present invention generally relates to an arrangement adapted to manufacture various kinds of magnetic cards such as cash cards, credit cards, membership cards or time cards, and more particularly to an arrangement for manufacturing a magnetic card having a double-layered core composed of a front and a rear core materials.

2. Description of the Prior Art

A magnetic card 24 having a double-layered core is, as is seen from a perspective view of FIG. 1 and from an exploded perspective view of FIG. 2, comprised of a core (base plate) 25 formed of a printed double-layered plastic plate, overlays 26 and 27 overlapped respectively on front and rear surfaces of the core 25 and a magnetic tape 28 of a small width bonded to an outer front surface of the overlay 26. The overlays 26 and 27 are made of a transparent plastic film.

The magnetic card 24 in the above-mentioned structure has conventionally been manufactured in the following manner.

1) Many units of cores are printed in alignment on a large rectangular raw material. An overlay in the same rectangular shape is positioned and overlapped on each of the front and rear surfaces of the raw material. A magnetic tape is so positioned on an outer surface of the overlay at the front side of the card as to be aligned with the row of units of magnetic cards, which is then bonded to be a composite.

2) The obtained composite and a stainless plate having a mirror finished surface are overlapped many, and fed to a multistage press for thermal press, whereby the overlays and the raw material sandwiched therebetween are integrally laminated.

3) Each laminated composite is then supplied to a cutting machine to punch out every unit of core. A magnetic card of a predetermined size is hence obtained.

Every process in the above-described conventional manufacturing arrangement is executed for each one rectangular raw material. Moreover, the material is transferred, supplied and discharged to or from each processing unit manually. Therefore, it is difficult according to the conventional manufacturing method to obtain magnetic cards effectively with high positioning accuracy and with high productivity.

Although it is devised to automatize the transfer, supply or discharge of raw materials among the processing units, it cannot be avoided that the transfer means, positioning and supplying means, discharging means, etc. required are complicated in structure because many rectangular sheets of materials are handled every one sheet. Furthermore, processing speed should be matched or synchronized among the processing units by some means. As a result, the arrangement structure as a whole becomes complicated, expensive and bulky in size.

SUMMARY OF THE INVENTION

Accordingly, the present invention has been developed with a view to substantially eliminating the above-described disadvantages inherent in the prior art, and has for its essential object to provide a magnetic card manufacturing arrangement adapted to manufacture magnetic cards with high efficiency without consuming labor, which is relatively simple and compact in structure.

A further object of the present invention is to provide a magnetic card manufacturing apparatus which is advantageously suitable to constitute a magnetic card manufacturing arrangement, whereby a front and a rear core materials forming a double-layered core of the card can be aligned and overlapped, and a composite composed of the core materials and an overlay attached with a tape can be aligned and overlapped, effectively and accurately, realizing structural simplification for post-treatment.

A yet object of the present invention is to provide a laminating device for use in manufacturing magnetic cards, wherein a metallic belt or a pressuring plate can be assembled with ease and at low cost, while retaining a uniform pressuring force for a long term of use.

A still yet object of the present invention is to provide a cutting device for use in manufacturing magnetic cards, whereby, while the magnetic cards are punched out efficiently and accurately with stable quality, the finished magnetic cards can be taken out continuously without consuming labor, thereby improving the productivity.

In accomplishing the above-described objects, according to the present invention, the magnetic card manufacturing arrangement is comprised of an overlay transfer line, a magnetic tape feed mechanism, a core material feed mechanism, an overlay overlapping mechanism, a laminating mechanism and a card cutting mechanism. The overlay transfer line transfers a continuous band-shaped overlay made of a plastic film which will be a front surface of the magnetic card along a predetermined course. The magnetic tape feed mechanism supplies a magnetic tape to an outer front surface of the front overlay. The core material feed mechanism intermittently feeds material plates each including a plurality of units of cores in a synchronizing manner with the transfer of the overlay onto a rear surface of the front overlay and aligns the same in the form of a column in a transfer direction of the overlay. The material plate overlapped onto the rear surface of the front overlay is overlapped with a continuous band-shaped rear overlay thereon by the overlay overlapping mechanism. Then, a continuous magnetic card material with the material plate sandwiched between the front and rear overlays is thermally pressed by the laminating mechanism, thereby to integrally form the card material. After the continuous card material passes the laminating mechanism, each core is punched out from the card material by the card cutting mechanism.

In the above-described structure, necessary processes, namely, adhesion of the magnetic tape, supply of the core material, supply and overlap of the rear overlay, lamination and cutting of the card material can be carried out in sequence in the transfer line of the front overlay, with utilizing the front overlay itself as a transfer medium for transferring the other materials.

According to a further aspect of the present invention, the magnetic card manufacturing apparatus includes a carrier means for transferring front and rear core materials each including many units of cores alternately to a common conveyor from an accommodating unit, a stopper for supporting the core material transferred in a predetermined direction by the conveyor at a fixed position, an overlapping means for displacing the supported preceding core material above or below a transfer surface of the conveyor to overlap the same with the succeeding core material, a first positioning means for positioning the relative position of the two core materials, a first temporary welding means for temporarily welding the positioned composite of the two core materials through spot welding, a feed means for feeding the composite after being temporarily welded to an overlapping position where it is overlapped with a continuous band-shaped overlay bonded with a magnetic tape, a second positioning means for positioning the relative position of the composite and the overlay with the tape, and a second temporary welding means for temporarily welding the positioned composite and the overlay with the tape through spot welding.

Along with the above-described constitution of the magnetic card manufacturing apparatus, a material cutting means is provided to obtain strips of material plates including a plurality of core units by cutting the composite of core materials temporarily welded by the first welding means.

The overlay attached with a magnetic tape used in the arrangement of the present invention can be obtained by bonding a magnetic tape to the overlay beforehand, or by providing a tape bonding means which consists of a feed roll of the overlay and a feed roll of a material tape attached with a magnetic tape, so that the magnetic tape is bonded to the overlay before the overlay is transferred to the second welding means.

Accordingly, in the structure of the manufacturing apparatus, if only the front and rear core materials are set in the accommodating unit, both core materials are automatically alternately taken out from the unit and temporarily welded in the overlapped and positioned state. The temporarily welded composite of core materials is further overlapped with the overlay attached with the tape, which is, after being temporarily welded, sent to a process for post-treatment.

When the composite of the core materials cut into strips of material plates is temporarily welded to the overlay attached with the tape, it can be of a small width thereby to be smoothly transferred to the post-treatment process.

In the laminating device for obtaining ID cards according to a yet aspect of the present invention, there are provided a belt conveyor which has a pair of endless metallic belts wound confronting each other so as to clip and transfer a card material from front and rear, pressuring plates arranged in parallel to a moving direction of the metallic belts and within inner peripheral surfaces of the pair of metallic belts, and hydraulic cylinders interlocked with the pressuring plates. Moreover, a press mechanism is provided which can adjust the heating temperature of each pressuring plate and the pressure of each hydraulic cylinder independently, and heat-proof resin sheets are intervened between the pressuring plates and metallic belts for making the adding pressure uniform. It is preferable for the resin sheet to be formed in a continuous band-shape extending all over the entire range of the pressuring plates. Moreover, in adjusting the pressure of the hydraulic cylinder, it is preferable to reduce the pressure such that a face-to-face contact between the metallic belts and, the front and rear surfaces of the card material is retained during a constant move of the belt conveyor.

Therefore, according to the laminating device in the above-described structure, when the card material is pressed by each pressuring plate through the metallic belts, since errors in thickness of the metallic belts, and planeness and parallelism of the pressuring plates can be absorbed by the resin sheets, the card material can be added with a uniform pressure. When the metallic belts are moved, the inner peripheral surfaces of the metallic belts are brought in sliding contact with the resin sheets. Accordingly, if the card material is kept to be added with the pressure by the hydraulic cylinder which is reduced so much as to maintain the face-to-face contact between the metallic belts and the front and rear surfaces of the card material, it is prevented that the air steals into between the metallic belts and the front and rear surfaces of the card material.

A cutting device for ID cards according to a still yet aspect of the present invention is provided with a carrier means which transfers a continuous card material having a laminated material plate including a plurality of core units clipped between continuous band-shaped front and rear overlays, and a punching means for punching out the core units from the transferred card material. The carrier means includes a first positioning means for correcting the position of the card material in a transfer direction, a second positioning means for correcting the position of the card material in a direction orthogonal to the transfer direction, and a third positioning means for eliminating an inclination of the card material to the transfer direction.

In addition to the above-described constitution, the cutting device has a card discharge conveyor for carrying out a punched ID card horizontally from a punching position, a guide means for guiding the ID card from the terminal of the discharge conveyor in a standing posture, a pressing means for pressing and transferring the standing ID card at a predetermined stroke to be sequentially overlapped in a direction of a normal line of a face thereof, a card receiving means for receiving the overlapped ID cards from the rear, and retracting a receiving position sequentially to a card forwarding direction by the force of the pressing means, and a take-out means for pressing and transferring the whole of the overlapped ID cards in the standing posture in a horizontal direction orthogonal to the overlapping direction.

In the structure of the cutting device described above, while the card material is retained by the carrier means, it can be automatically positioned in the transfer direction and in the orthogonal direction to the transfer direction and, in the inclining position to the transfer direction, and then punched out every unit of core.

Moreover, the ID cards overlapped in the standing posture can be taken out every predetermined number of sheets as they are punched out.

BRIEF DESCRIPTION OF THE DRAWINGS

These and other objects and features of the present invention will become apparent from the following description taken in conjunction with preferred embodiments thereof with reference to the accompanying drawings, in which:

FIGS. 3–33 show a system for manufacturing magnetic cards in which is incorporated a magnetic card manufacturing arrangement according to the present invention;

FIG. 3 is a plane view schematically showing the whole of the manufacturing system;

FIG. 4 is a front elevational view schematically showing the manufacturing system;

FIG. 5 is a perspective view explanatory of the processing state at a front half stage of the line;

FIG. 7 is a plane view of a core material feed mechanism;

FIG. 8 is a side elevational view of the core material feed mechanism;

FIG. 9 is a front elevational view of an accommodating unit in the core material feed mechanism;

FIG. 10 is a side elevational view of a raw material overlapping unit in the core material feed mechanism;

FIG. 11 is a plane view of the raw material overlapping unit in the core material feed mechanism;

FIG. 12 is a sectional view taken along the line A—A of FIG. 11;

FIG. 13 is a side elevational view of a material cutting unit and a material filling unit of the material feed mechanism;

FIG. 14 is a side elevational view of a card cutting mechanism;

FIG. 15 is a front elevational view of the card cutting mechanism;

FIG. 16 is a plane view of a material attitude adjusting device and a screw feeder of the card cutting mechanism;

FIG. 17 is a front elevational view of FIG. 16;

FIG. 18 is a sectional view taken along the line B—B of FIG. 16;

FIG. 19 is a front elevational view showing the whole of a laminating device, partially removed;

FIG. 20 is a perspective view of FIG. 19, partially abbreviated;

FIG. 21 is an enlarged sectional view of an essential portion of FIG. 21, partially removed;

FIG. 23 is a cross sectional view of a press mechanism;

FIG. 25 is a graph showing the change of a heating temperature and the change of a temperature of a card material;

FIG. 26 is a side elevational view of a cutting device, partially removed;

FIG. 27 is a front elevational view of the cutting device, partially removed;

FIG. 28 is a plane view of a material attitude adjusting device and a screw feeder in the cutting device;

FIG. 29 is a side elevational view of FIG. 28;

FIG. 30 is a sectional view taken along the line V—V of FIG. 28;

FIG. 31 is a side elevational view of a card discharge belt and a take-out device;

FIG. 32 is a plane view of FIG. 31; and

FIG. 33 is a front view in vertical section of the take-out device.

DESCRIPTION OF THE PREFERRED EMBODIMENTS

Figure 1:
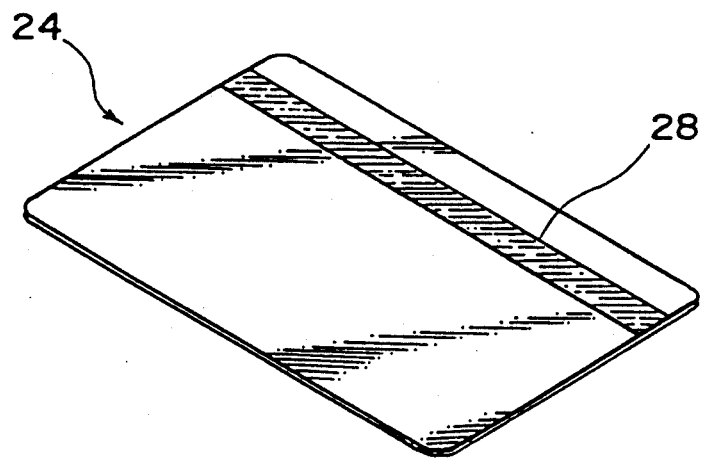
FIG. 1 is a perspective view of an outer appearance of a finished magnetic card.

Before the description of the present invention proceeds, it is to be noted here that like parts are designated by like reference numerals throughout the accompanying drawings.

A preferred embodiment of the magnetic card manufacturing arrangement according to the present invention will be described in detail hereinbelow.

As described earlier with reference to FIGS. 1 and 2, the magnetic card 24 having a double-layered core is comprised of a core (base plate) 25 which is formed of two printed plastic plates, overlays 26 and 27 overlapped onto the front and rear surfaces of the core 25 respectively, and a magnetic tape 28 in a small width bonded to an outer surface of the overlay 26 which becomes a front surface of the magnetic card.

Figure 3:
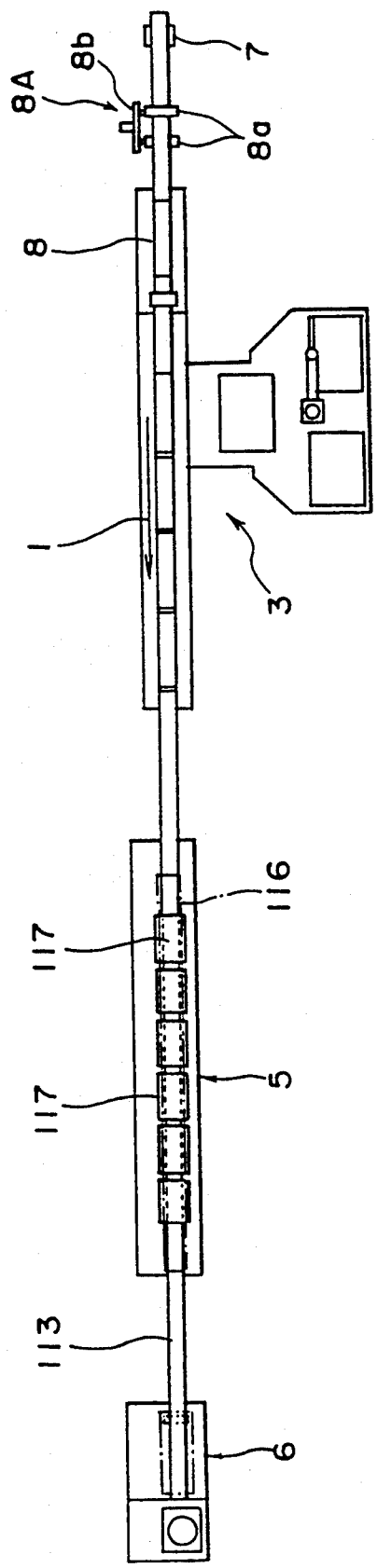
Figure 4:
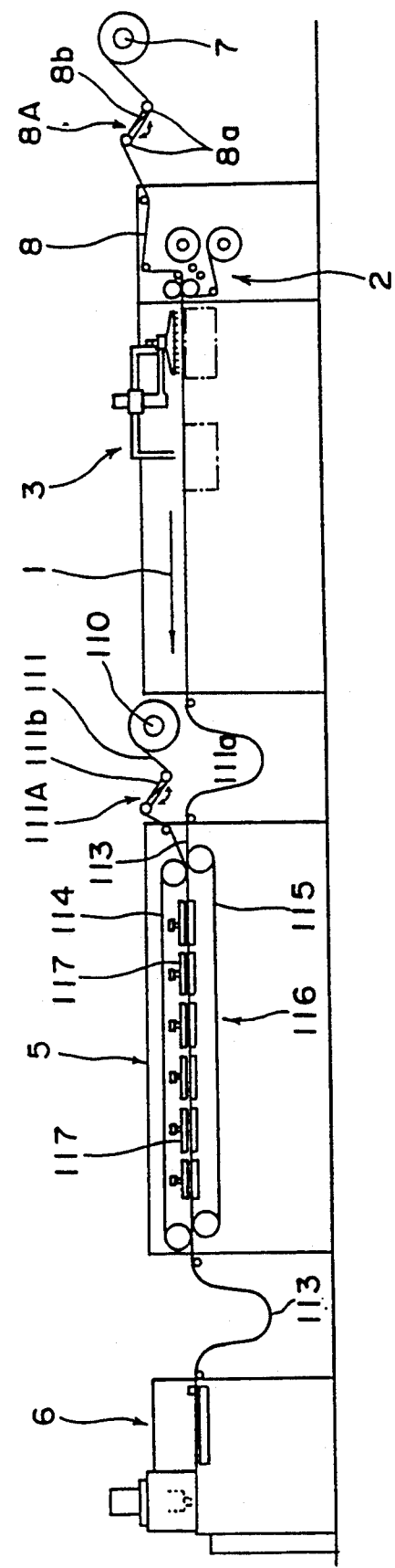

FIG. 3 is a plane view schematically showing the whole of a magnetic card manufacturing system incorporated with a magnetic card manufacturing arrangement of the present invention, and FIG. 4 is a schematic front elevational view of FIG. 3.

In the magnetic card manufacturing system shown in FIGS. 3 and 4, there is provided an overlay transfer line 1 as a base line of the system which runs linearly from the right to left in the drawing. Moreover, the magnetic card manufacturing system includes a magnetic tape feed mechanism 2, a core material feed mechanism 3, an overlay overlapping mechanism 4, a laminating mechanism 5 and a card cutting mechanism 6, from the upper to the lower course of the line 1.

At the uppermost of the overlay transfer line 1 is mounted an overlay roll 7. A continuous band of an overlay 8 which is made of a transparent rigid polyvinyl chloride film is sent out from the overlay roll 7 to a tension adjusting mechanism 8A and many guide rollers 9 to a pair of upper and lower rotating feed rollers 10 and 11. It is so arranged that the overlay 8 is intermittently sent out a preset amount along a predetermined horizontal linear course. A support arm 8b of the tension adjusting mechanism 8A which holds rollers 8a and 8a rotatably at opposite ends thereof is rotatably supported at the center in the longitudinal direction thereof, and is interlockingly coupled with a pneumatic rotary actuator (not shown). A predetermined tension is hence applied to the overlay 8 by controlling the air pressure of the actuator.

Figure 5:
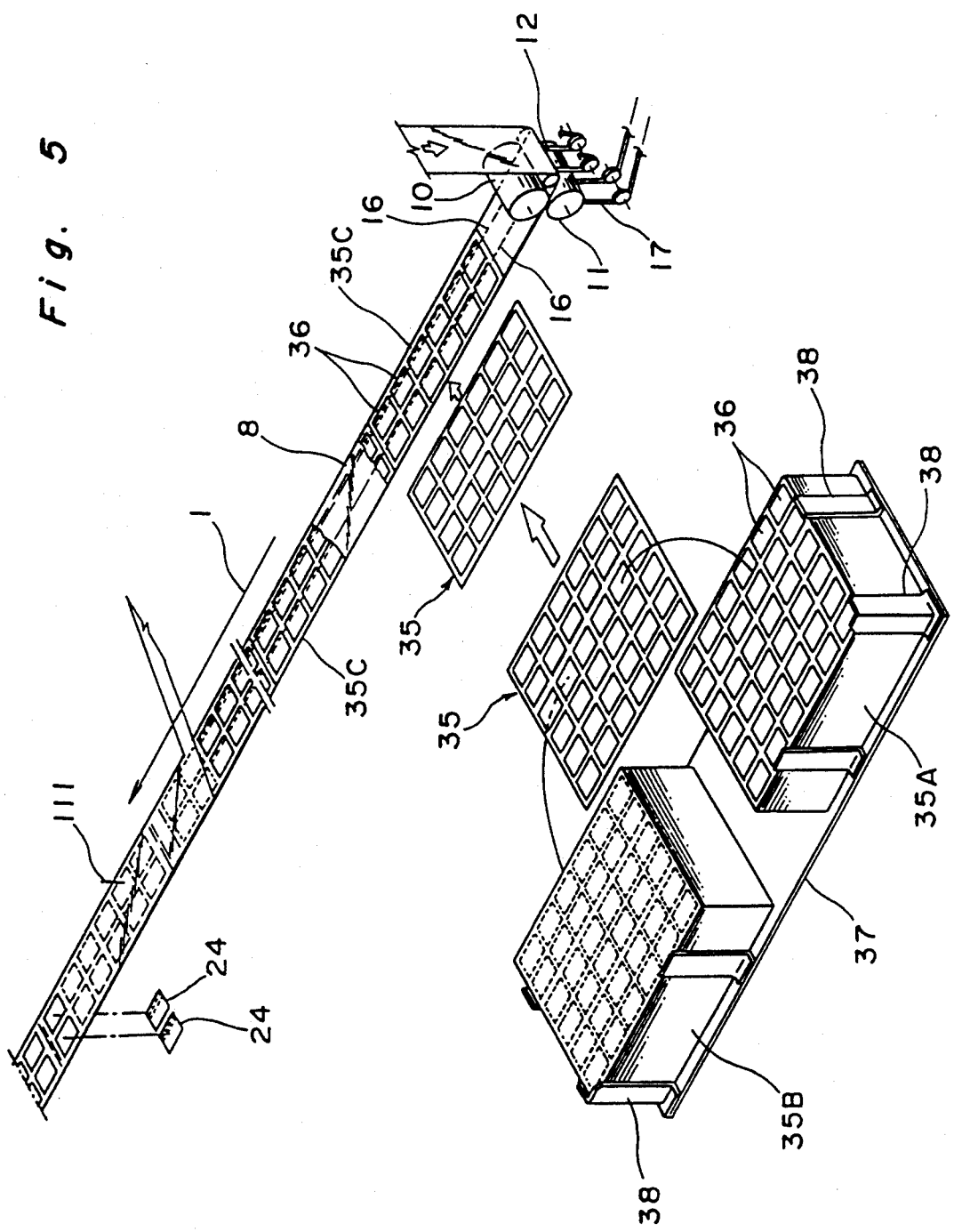
Figure 6A:
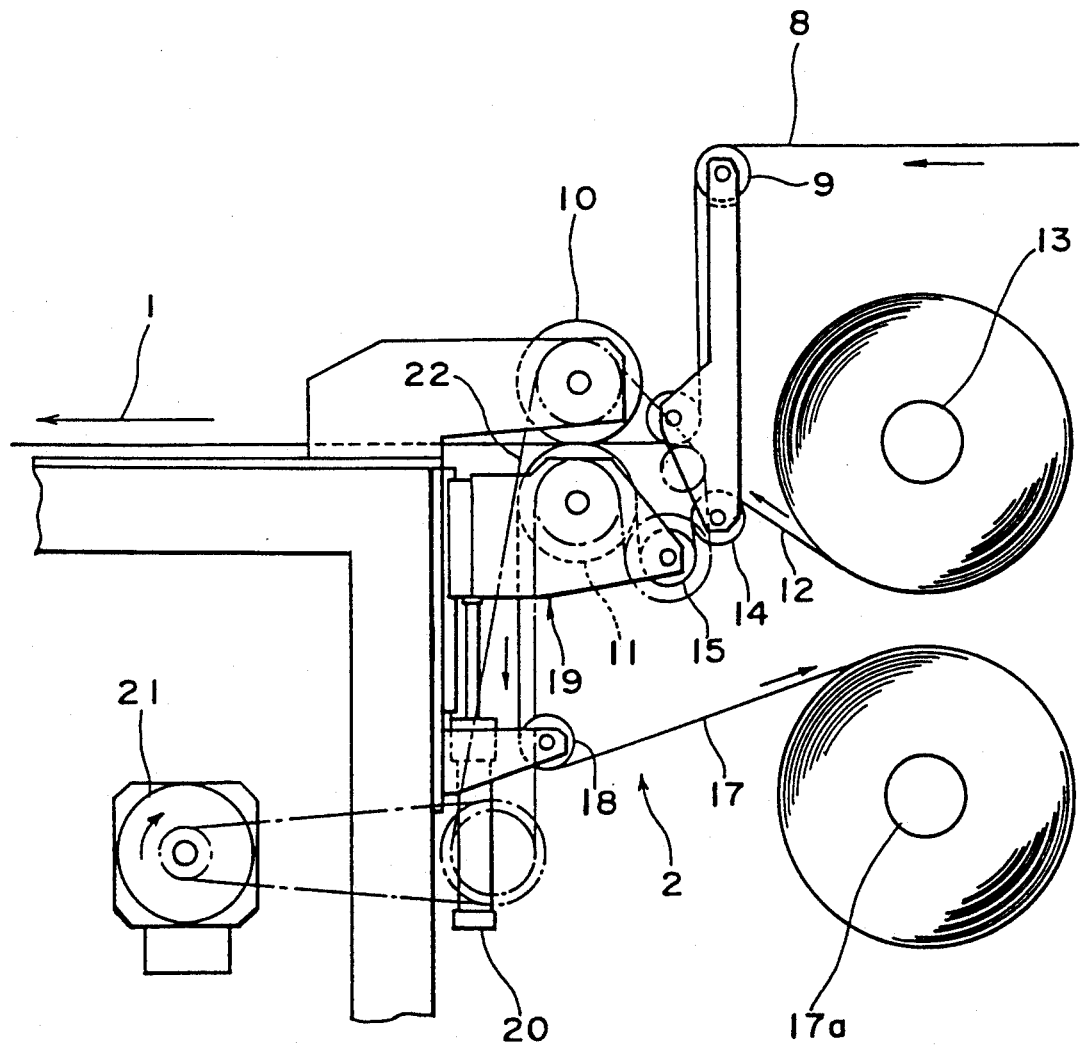
FIG. 6(A) is a front elevational view of a magnetic tape feed mechanism.

In the magnetic tape feed mechanism 2, as indicated in a perspective view of FIG. 5 and a front elevational view of FIG. 6(A), a material tape 12 obtained by bonding a magnetic tape to an inner surface of a base tape is intermittently supplied a predetermined length from a take-up roll 13 through guide rollers 14 and 15 to between the above-mentioned feed rollers 10 and 11, whereby the magnetic tape 16 is adhered to a lower surface of the overlay 8 with pressure, and at the same time, detached from the base tape 17 which is in turn wound back around a recovery roll 17a through a guide roller 18. These overlay roll 7, guide rollers 9, feed rollers 10 and 11, material tape 12, take-up roll 13, guide rollers 14, 15 and 18 and recovery roll 17a constitute a tape bonding means.

The upper and lower feed rollers 10 and 11 are hot rollers at a suitable temperature (about 90° C.) so as to securely bond the magnetic tape 16 to the overlay 8.

The lower feed roller 11 is, together with the guide roller 15, held by a movable bracket 19 which is movable up and down by a pneumatic cylinder 20. When the overlay 8 is stopped transferring, both the feed roller 11 and guide roller 15 are descended, thereby cutting the magnetic tape 16 adhered to the overlay 8 from the magnetic tape 16 at the side of the material tape 12. Simultaneously with this, an end portion of the magnetic tape 16 at the side of the material tape 12 is moved to the fixed guide roller 14, and the magnetic tape is separated from an outer peripheral surface of the hot feed roller 11. On the other hand, the overlay 8 adhered with the magnetic tape 16 is advanced a slight distance (for example, not longer than 30 mm, which, as will be described later, can be set to be any length within the distance between confronting end faces of core units 36 and 36 of two adjoining core material plates 35C and 35C), in accordance with the descent of the lower feed roller 11. Accordingly, an end portion of the magnetic tape 16 adhered to the overlay 8 is detached from the upper feed roller 10, thereby to prevent the magnetic tap 16 from being locally heated. Hereinafter, the overlay 8 adhered with the magnetic tape 16 will be referred to as a tape-adhering overlay 8.

In FIG. 6(A), a reference 21 indicates an electric motor for driving the feed rollers 10 and 11, and a reference 22 is a transmission belt.

Figure 6B:
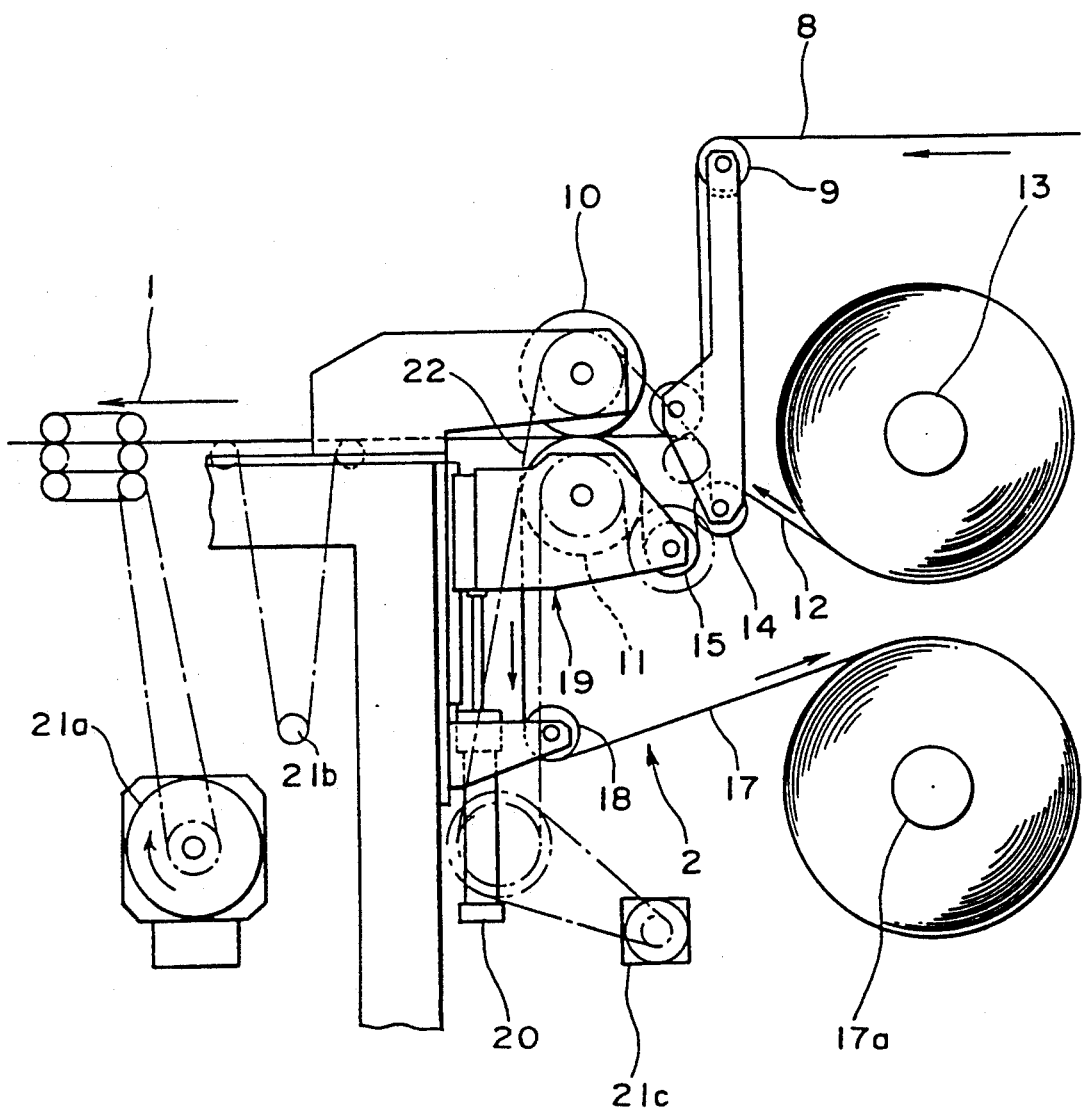
FIG. 6(B) is a similar view to FIG. 6(A), showing a modification of the magnetic tape feed mechanism.
Figure 7:
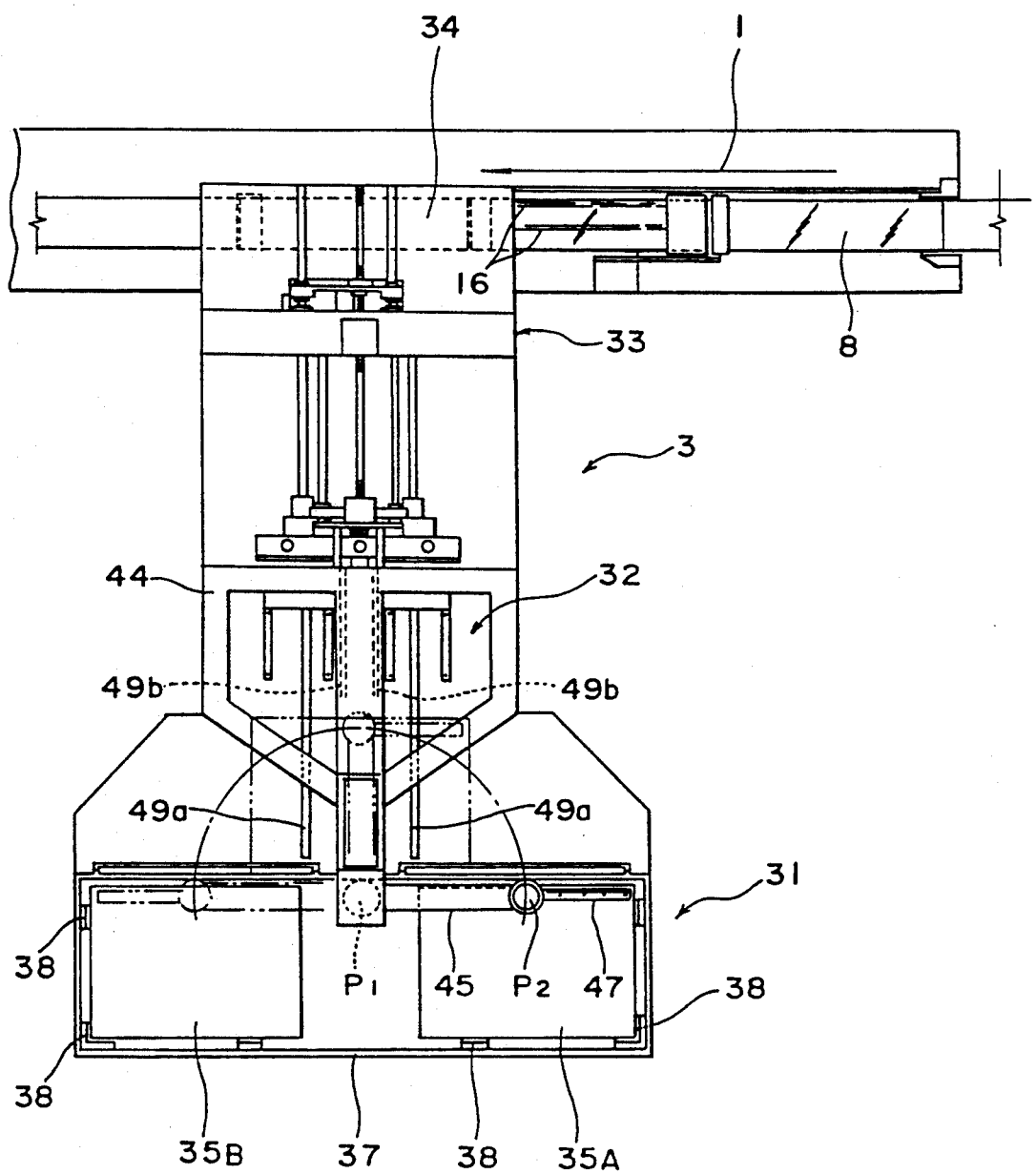
Figure 8:
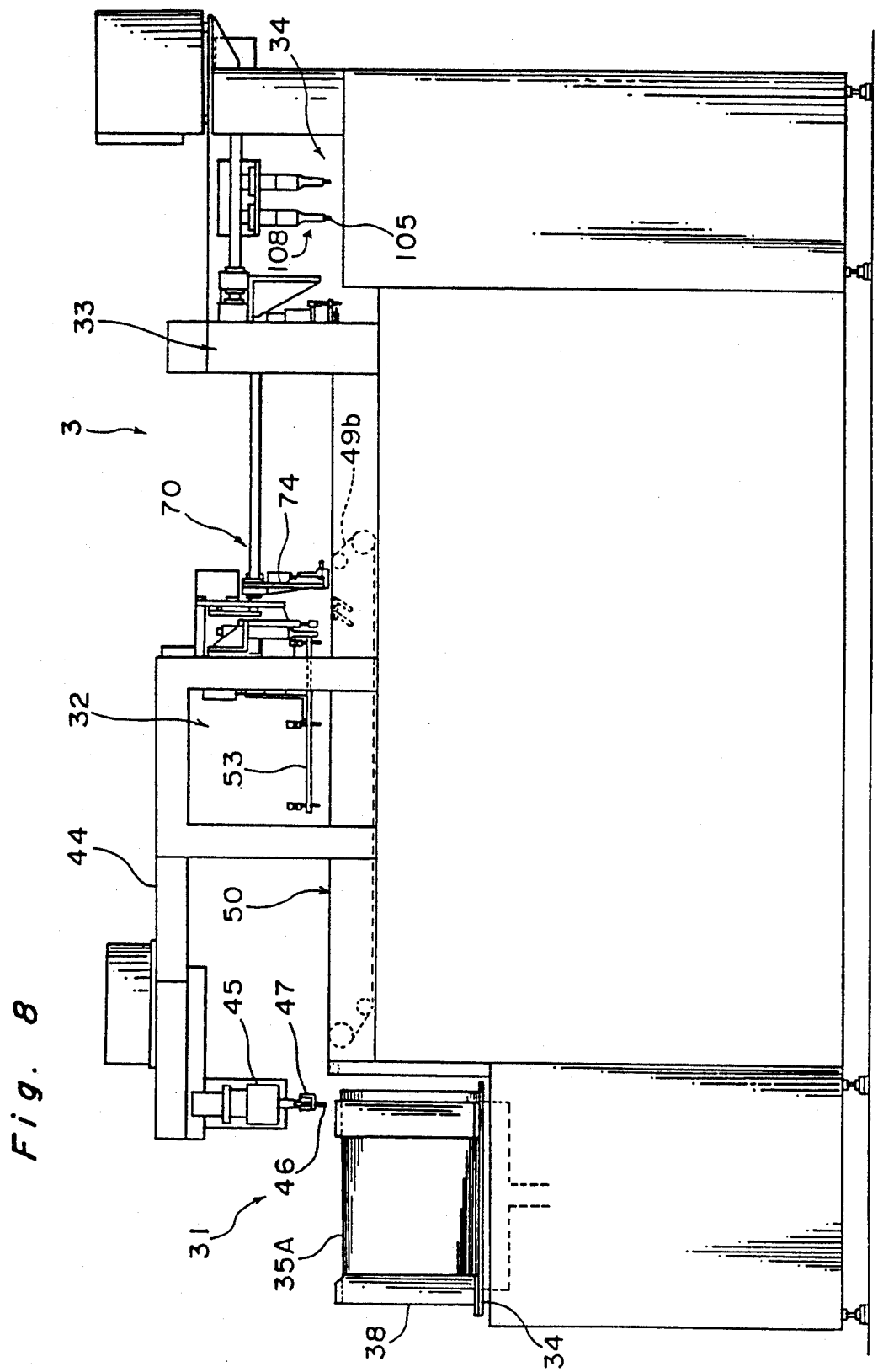

FIG. 6(B) shows a modification of the magnetic tape feed mechanism 2 shown in FIG. 6(A), wherein there provide another motor 21c for driving the base tape 17 and a sliding mechanism 21b for adjusting the length of the magnetic tape 1 which is driven by the motor 21a.

Figure 10:
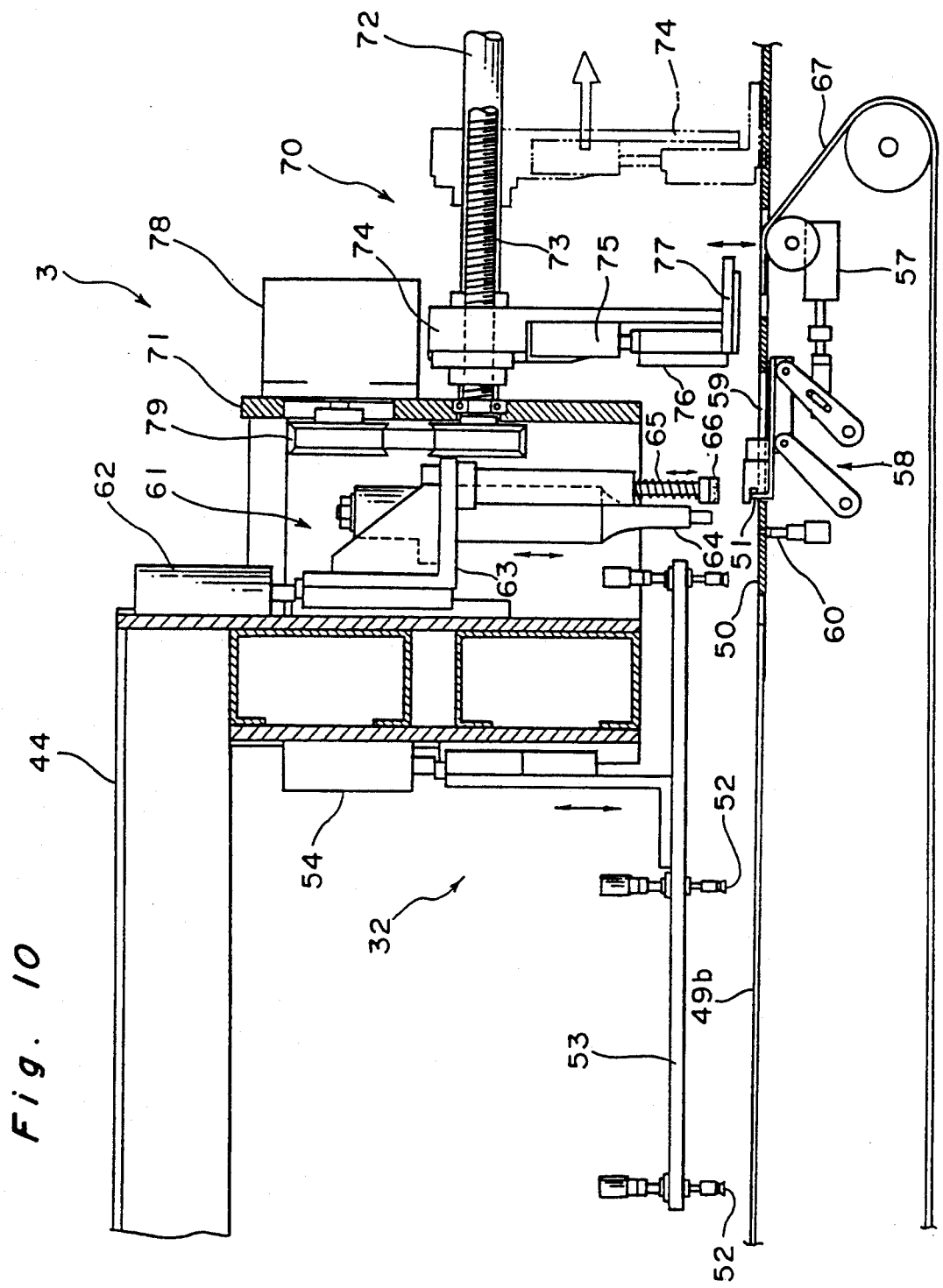
Figure 11:
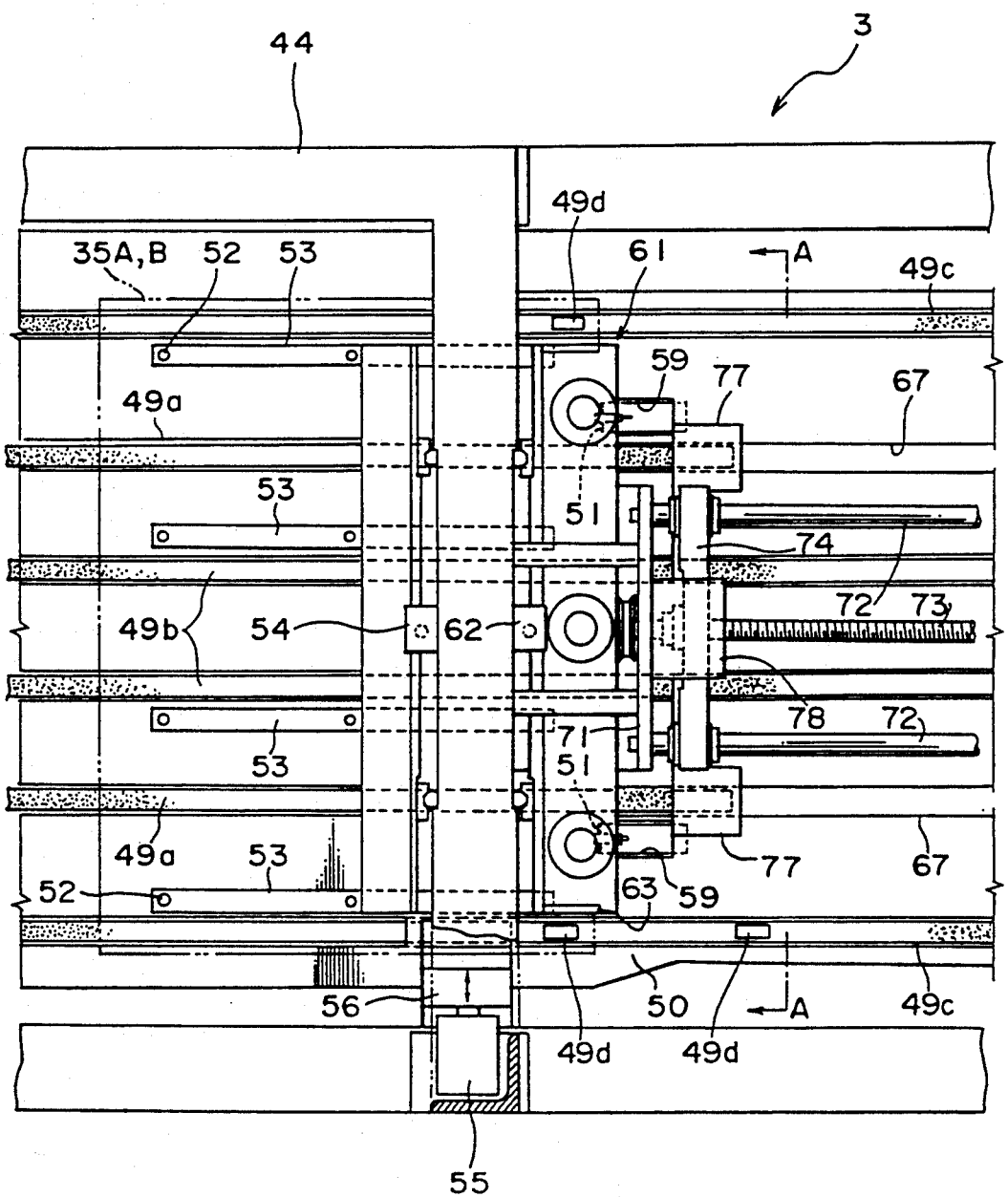
Figure 12:
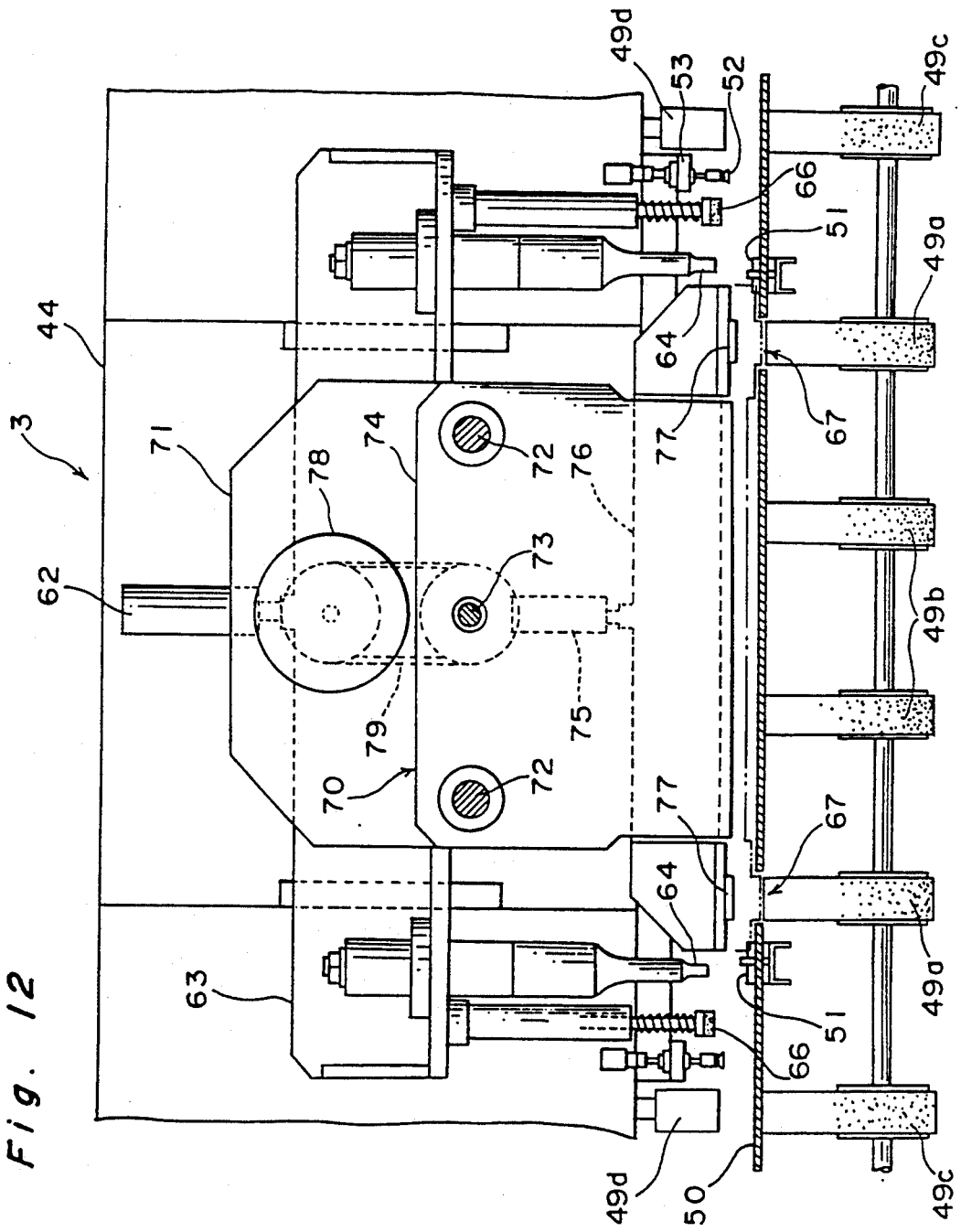

FIGS. 7-12 are respectively a plane view of a core material feed mechanism, a side elevational view of the core material feed mechanism, a front elevational view of an accommodating unit in the core material feed mechanism, a side elevational view of an overlapping unit in the core material feed mechanism, a plane view of the overlapping unit of the core material feed mechanism and a sectional view taken along the line A—A of FIG. 12. As shown in these FIGS. 7-12, the core material feed mechanism 3 is comprised of the accommodating unit 31, the overlapping unit 32, a core material cutting unit 33 and a core material filling unit 34.

Figure 2:
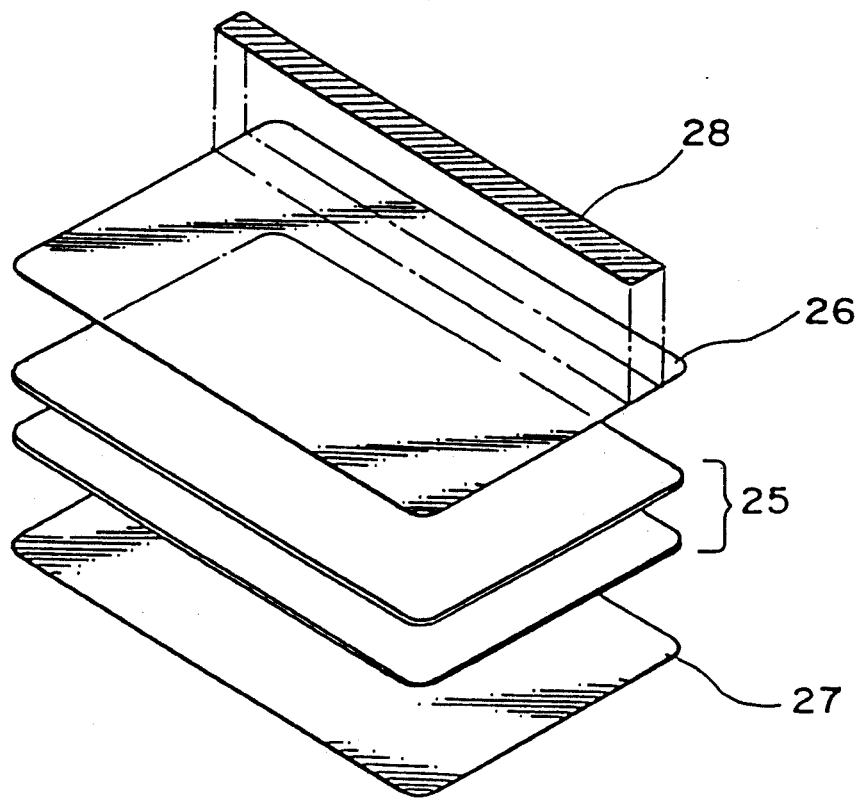
FIG. 2 is an exploded perspective view showing the composition of the magnetic card.

The magnetic card manufactured by the arrangement of the present invention has the double-layered core 25 as shown in FIG. 2, which core is formed of two sheets of core materials 35A and 35B. Each sheet of core material 35A or 35B which is a large plate made of rigid polyvinyl chloride includes many units of cores 36 (each unit will become a sheet of magnetic card by punching) aligned and printed a predetermined pitch in a lengthwise and a widthwise directions thereon (referring to FIG. 5).

In the accommodating unit 31, the sheets of core material 35A which will be a front surface of the card to be bonded with the magnetic tape are laminated with the printing surfaces turned down, supplied onto a feed deck 37 where the sheets are positioned with the help of guides 38. On the other hand, the sheets of core material 35B which will be a rear surface of the card are laminated with the printing surfaces turned up, and positioned on the feed deck 37 by the guides 38.

Figure 9:
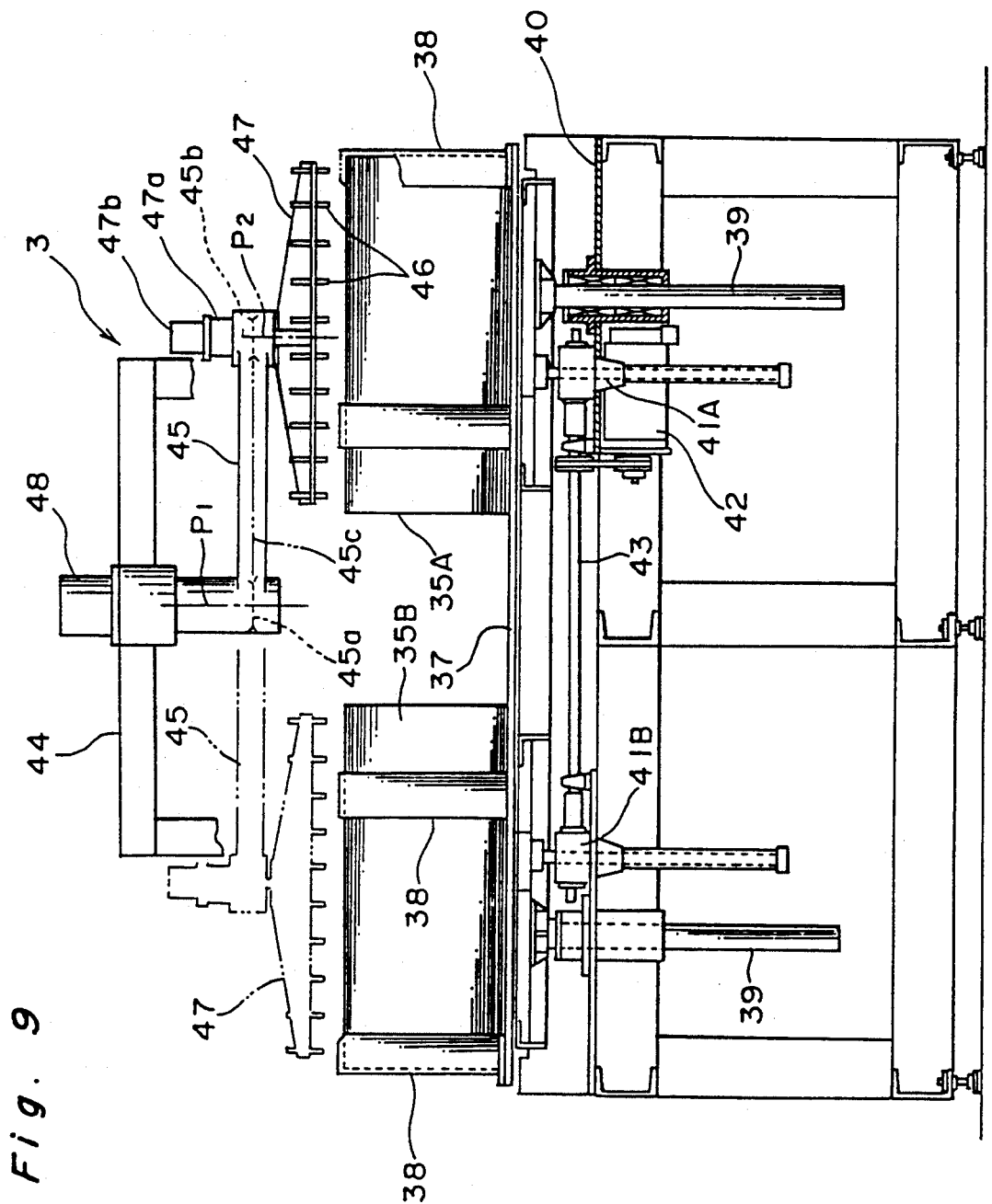

As indicated in FIG. 9, the feed deck 37 is supported horizontally by a frame member 40 through a pair of right and left slide shafts 39, and at the same time, moved up and down by a pair of right and left screw feeder devices 41A and 41B. The screw feeder devices 41A and 41B are driven in a synchronous manner by a common driving shaft 43 interlocked to an electric motor 42.

A feed arm 45 is fitted in a frame member 44 above the center of the feed deck 37. The feed arm 45 is freely turned about a longitudinal axis P1 by a pneumatic rotary actuator 48. Moreover, a support bracket 47a of a pickup arm 47 equipped with many vacuum suction nozzles 46 is so fitted at a free end of the feed arm 45 as to be rotatable around a longitudinal axis P2. The pickup arm 47 is able to be driven up and down or fixed to the support bracket 47a by a pneumatic cylinder 47b.

Within the above supply arm 45 is provided a first fixed pulley 45a having the longitudinal axis P1 as the center of rotation. On the other hand, a second fixed pulley 45b is integrally provided in the support bracket 47a, with having the longitudinal axis P2 as the center of rotation. A timing belt 45c is stretched between these first and second fixed pulleys 45a and 45b. When the uppermost sheet of core material 35A or 35B is vacuum sucked at about a front edge portion thereof by the pickup arm 47, and the pickup arm 47 is rotated the same angle in a reverse direction as the feed arm 45 in synchronization therebetween, the sheet 35A or 35B is turned and transferred in a horizontal space. The sheets 35A and 35B are supplied alternately from the sheet 35A to 35B. Moreover, the feed deck 37 is also driven upwards every predetermined distance in accordance with the transfer or discharge of the sheet 35A or 35B.

The above-mentioned feed arm 45, vacuum suction nozzles 46 and pickup arm 47 constitute a carrier means.

Subsequent to the release of the material sheet 35A or 35B from vacuum suction, the sheet is moved onto four conveyor belts 49a and 49b to be immediately sent to the overlapping unit 32.

In the overlapping unit 32, as seen from FIGS. 10 and 11, a pair of right and left stoppers 51 protrude above the transfer surface of the conveyor belts 49a and 49b. The material sheet 35B is first brought to a halt in abutment with the stoppers 51. Because a plurality of pickup arms 53 equipped with suction nozzles 52 are so mounted in the frame member 44 above the stopped material sheet 35B as to be driven reciprocally in a vertical direction by a pneumatic cylinder 54, the material sheet 35B is once vacuum sucked and retained by the pickup arms 53 and under this state the sheet 35B is moved over the transfer surface 50.

Similarly, the material sheet 35A sent into the overlapping unit 32 is stopped and positioned by the stoppers 51. Then, the material sheet 35B hung over the transfer surface 50 by the pickup arms 53 is descended to be overlapped onto the material sheet 35A. The pickup arms 53 with suction nozzles 52 and the pneumatic cylinder 54 form an overlapping means. For the constitution of the overlapping means, it may be possible that the sheet material 35A transferred by the conveyor belts 49a and 49b is first moved below the transfer surface of the belts and the sheet material 35B is then transferred above the material sheet 35A to be overlapped each other.

A side pusher 56 which is retracted and accommodated by a pneumatic cylinder 55 is provided at a side of the material sheet 35A or 35B. Accordingly, a lateral edge of the material sheet 35A or 35B is aligned and positioned by projecting the pusher 56. A first positioning means is comprised of the pneumatic cylinder 55 and the side pusher 56.

The above-mentioned stoppers 51 are mounted at an upper end of a parallel four-series link mechanism 58 which is allowed to swing back and forth and up and down by a pneumatic cylinder 57 and, freely projectable from an opening 59 of the transfer surface 50 as they move back and forth. Thus, a front end of the material sheet 35A or 35B is adjusted in position by the reciprocal movement of the stoppers 51. Since it is so arranged that an end surface of the material sheet 35A under the material sheet 35B is detected by a transmitting-type photosensor, the end surface of the material sheet 35A is always set at a predetermined position by the stoppers 51 and the side pusher 56.

After the sheets 35A and 35B are completely overlapped in the positioned state, a front portion of the material sheet 35A is sucked by a suction mechanism 60 installed in the transfer surface 50 and at the same time front portions of the material sheets 35A and 35B are temporarily welded by a ultrasonic welder 61 which is a first temporary welding means mounted in the frame member 44.

The ultrasonic welder 61 is comprised of a movable frame 63 raised up and down by a pneumatic cylinder and three welding heads 64 arranged in parallel. The sheets 35A and 35B are welded at three points.

There is a retainer member 66 at each side of the movable frame 63. The retainer member 66 is slidable in a vertical direction, and displaceable upwards against the urging force of a spring 65. A front edge portion of the material sheet 35B is, before the welding heads 64 are pressed in contact therewith, fixed on the transfer surface 50 by the resiliency of the retainer member 66.

After the material sheets 35A and 35B are temporarily spot welded, the stoppers 51 are moved downwards and retracted from the opening 59, with the overlapped sheets 35A and 35B being forwarded again. Each rear end of the conveyor belts 49a terminates at a position before rear ends of the central conveyor belts 49a, with having a slit 67 formed on the transfer surface 50 extending further than the rear ends of the central conveyor belts 49a.

A screw conveyor 70 is placed in front of the overlapping unit 32, which is constituted of a pair of right and left horizontal guide shafts 72 held in a back and forth direction between the frame member 44 and a support shaft 71 coupled to the frame 44, a screw shaft 73, a carrier 74 slidably supported by the guide shafts 72 and engaged with the screw shaft 73, a movable bracket 76 raised up and down relative to the carrier 74 by a pneumatic cylinder 75, a pusher 77 provided at each right or left side of the movable bracket 76, an electric motor 78, a transmission belt 79, etc.

The pushers 77 are provided facing the slits 67 of the conveyor belts 49a. When the movable bracket 76 is descended, a lower part of the pusher 77 is accommodated in an extension of the slit 67. Therefore, after the material sheet 35A is forwarded by the central conveyor belts 49a, the pushers 77 are descended to the slits of the conveyor belts 49a and the carrier 74 is screwed frontwards, whereby a rear end of the material sheet 35 is engaged by the pushers 77 to be carried into a core material cutting unit 33.

Figure 13:
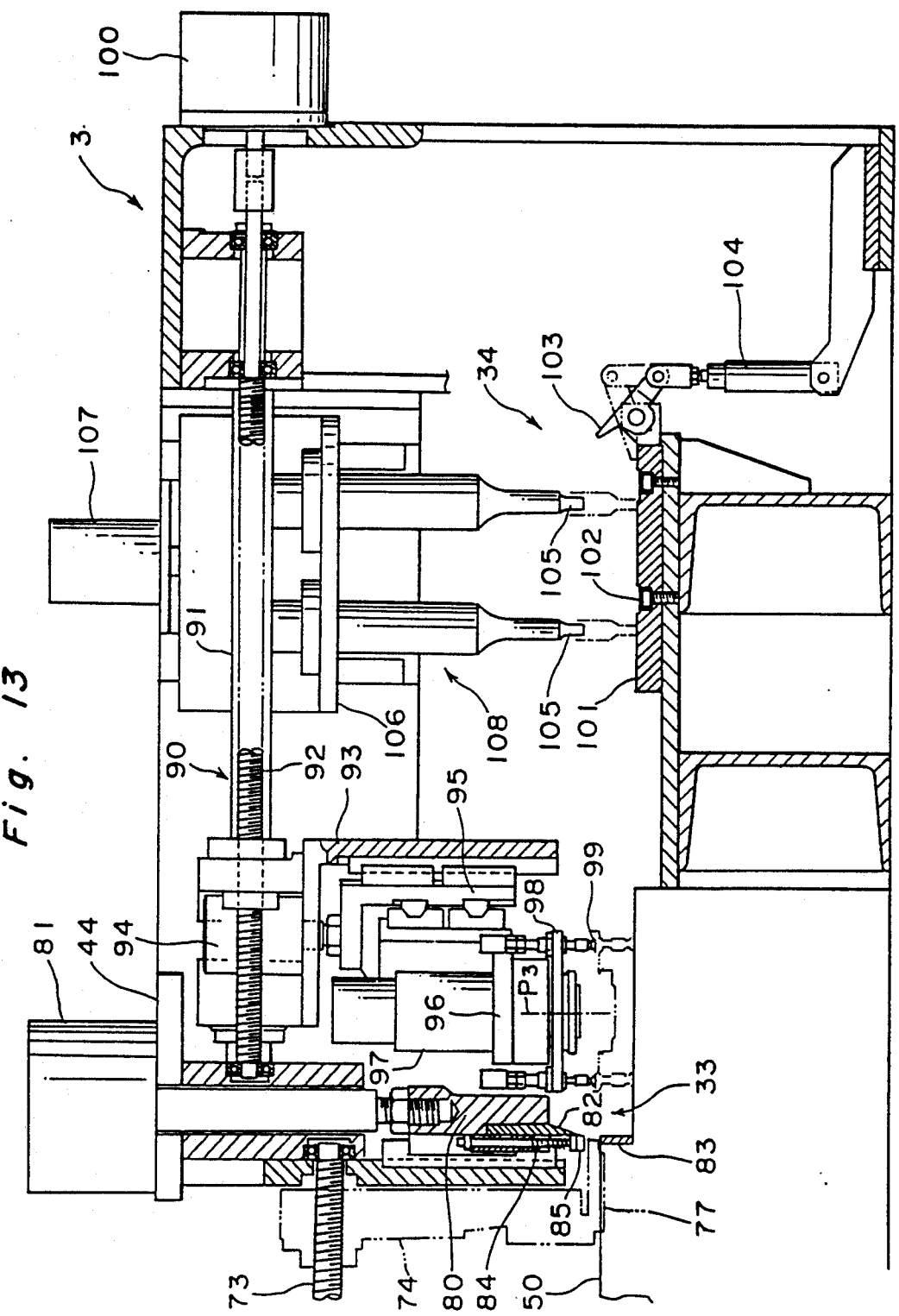
Figure 14:
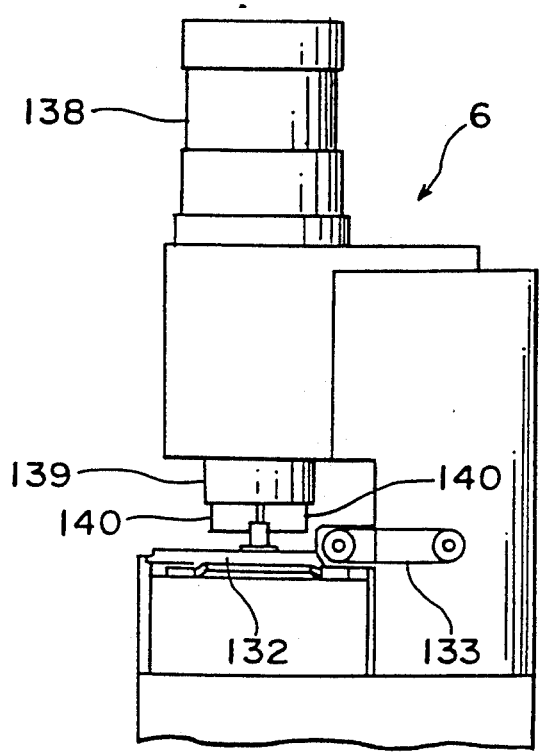
Figure 15:
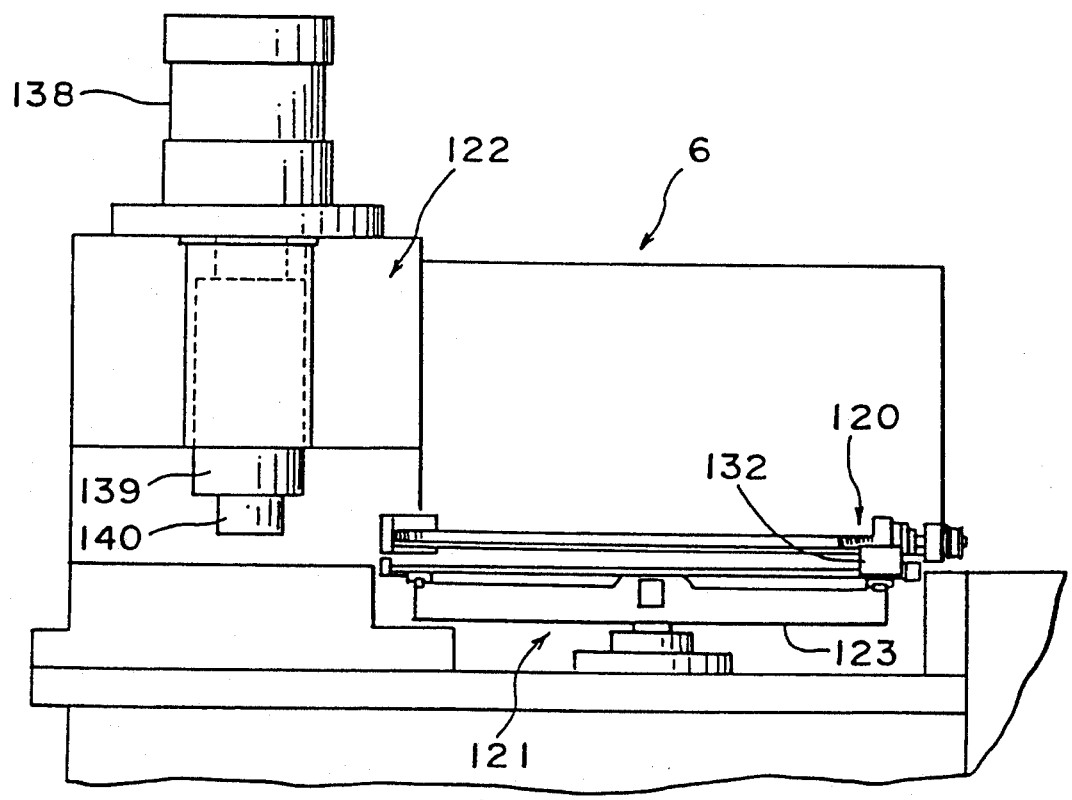
Figure 16:
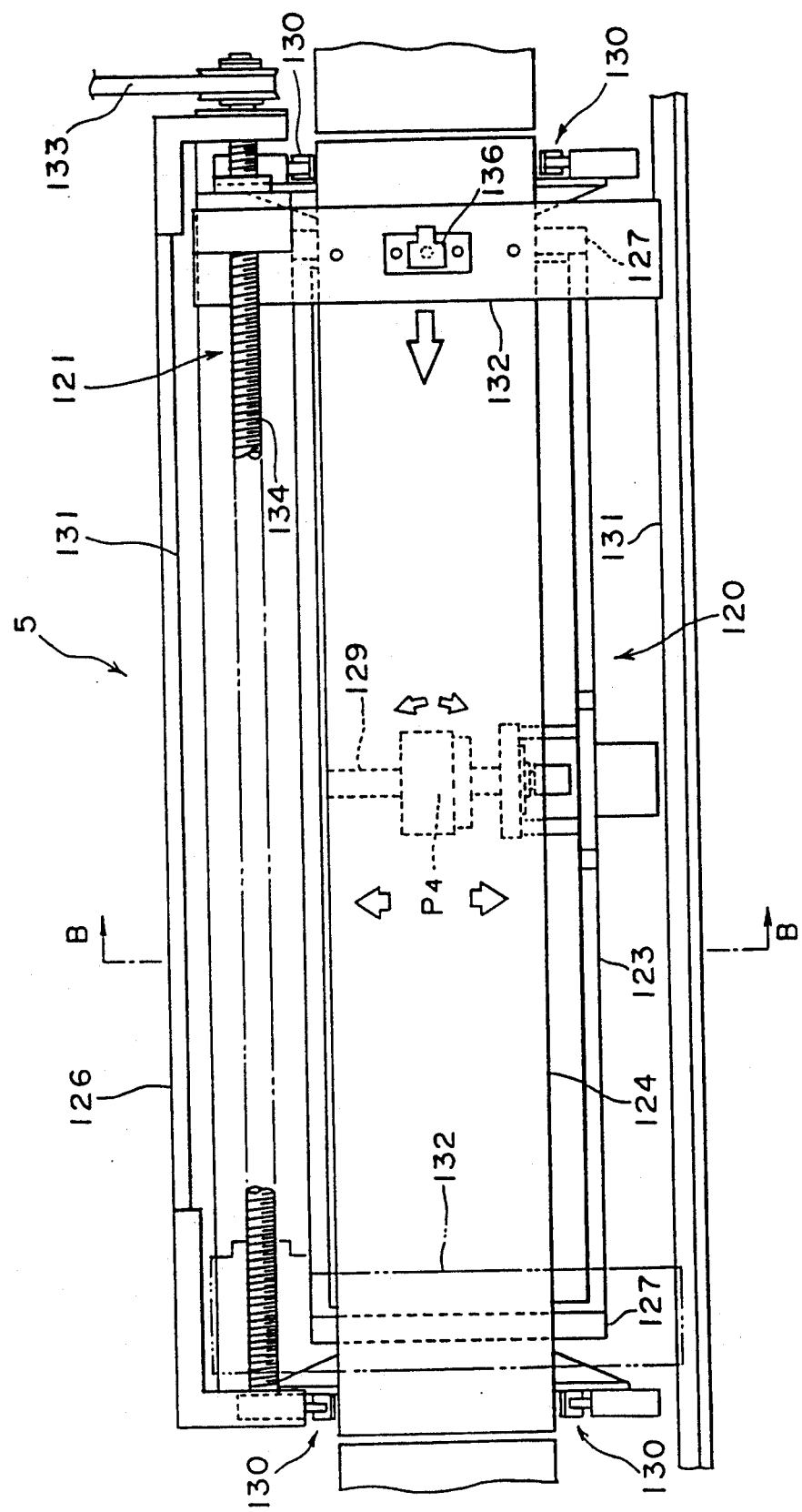
Figure 17:
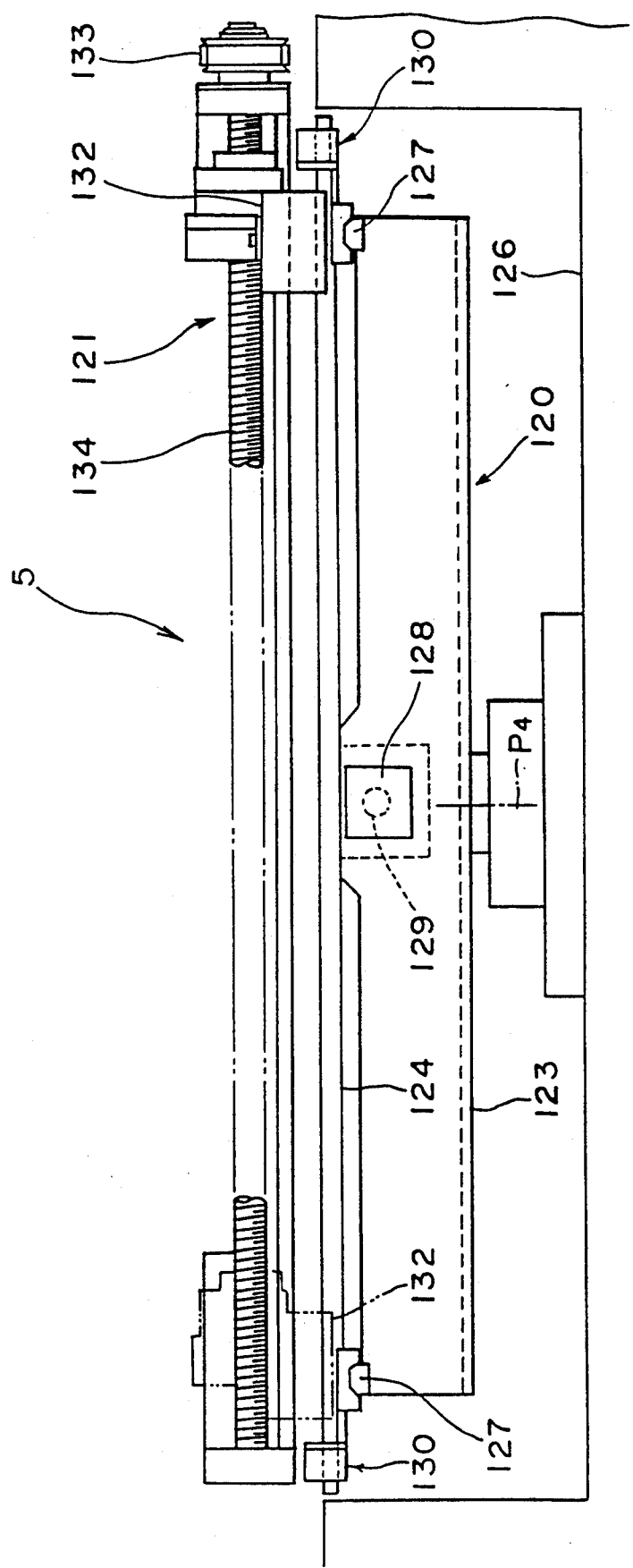
Figure 18:
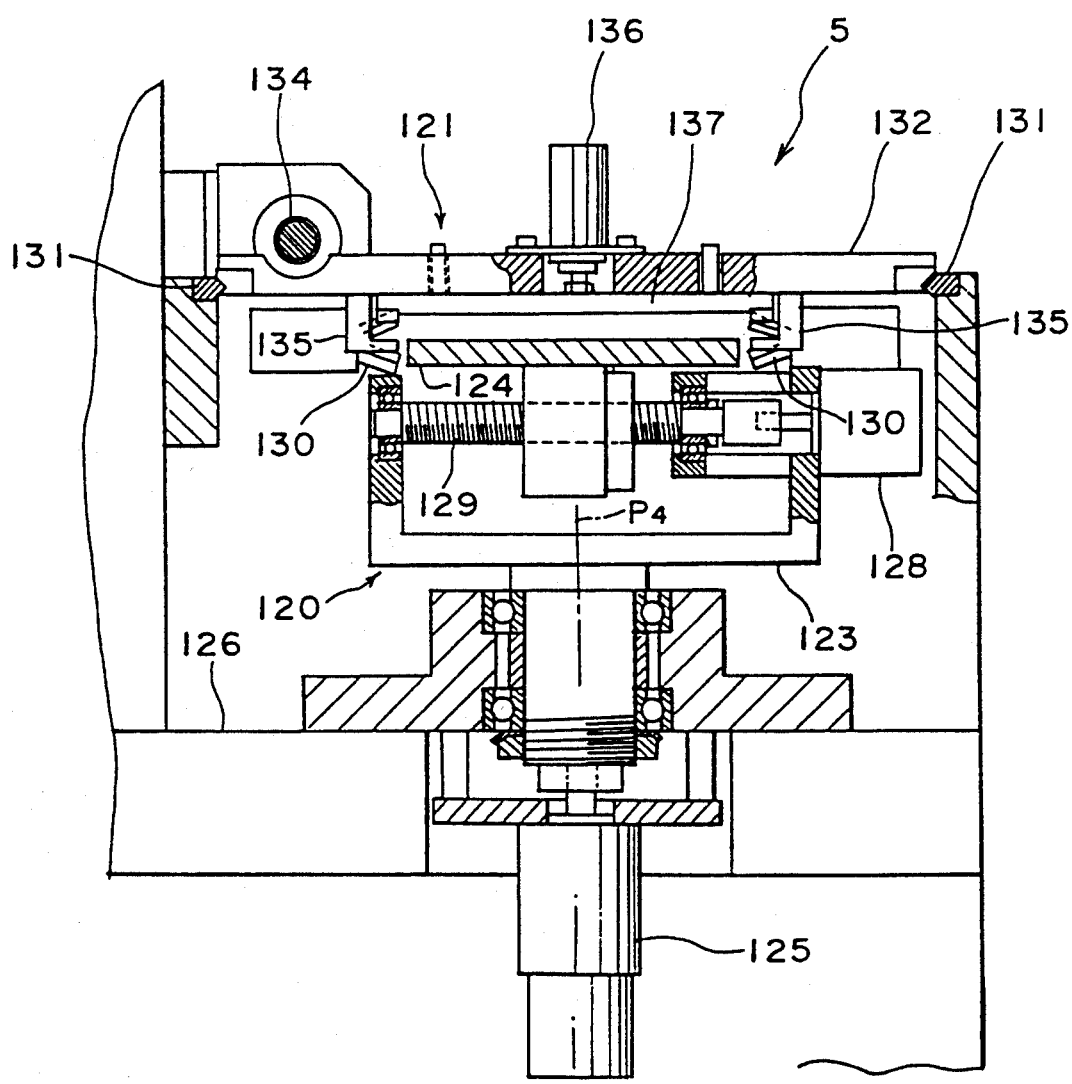

As indicated in a side elevational view of FIG. 13, there are provided in the core material cutting unit 33 a cutting blade 82 mounted at the lower part of a movable frame 80 and a fixed receiving blade 83 provided at the terminal end of the transfer surface 50. The material sheet 35 is cut by these blades 82 and 83 in the cutting unit 33 when the movable frame 80 which is held reciprocally movable in a vertical direction in parallel to the frame member 44 is driven up and down by a pneumatic cylinder 81. As a result, strips of material plates 35C with the same width as the tape-adhering overlay 8 are obtained. The core material cutting mean is formed of the cutting blade 82 and fixed receiving blade 83.

Another retainer member 85 is mounted in the movable frame 80, which is slidably in a vertical direction and displaceably upwards against the urging force of a spring 84. The retainer member 85 securely presses the material sheet 35 onto the fixed blade 83 in accordance with the fall of the cutting blade 82.

The core material plate 35C includes two rows of units of cores 36, which is carried into the core material filling unit 34 by a screw conveyor 90 as a supply means.

In the screw conveyor 90, there are provided a pair of right and left guide shafts 91 held horizontally in a back and forth direction, a screw shaft 92, a carrier 93 slidably held by the guide shafts 91 and engaged with the screw shaft 92, a first movable frame 95 mounted in the carrier 93 and raised up and down by a pneumatic cylinder 94, a second movable frame 96 provided in the first movable frame 95 and driven side to side by an electric motor (not shown), a rotary frame 98 with a suction nozzle 99 provided in the second movable frame 96 and rotated around a longitudinal axis P3 by an electric motor 97, and an electric motor 100 driven in a normal or reverse direction by the screw shaft 92, etc. In the core material filling unit 34, the material plate 35C is adjusted in an advancing direction by the arrangement of the screw conveyor 90, and in a direction orthogonal to the advancing direction through the second movable frame 96, and also with angles through the rotary frame 98. A second positioning means is comprised of the pneumatic cylinder 94, first movable frame 95, second movable frame 96, electric motor 97, rotary frame 98 and suction nozzle 99 in addition to the screw shaft 92 which works to adjust the feed amount of the material plate as mentioned above.

The core material filling unit 34 is set over the overlay transfer line 1, where the material plate 35C transferred while being suspended by the screw conveyor 90 is positioned onto an upper surface of the tape-adhering overlay 8 running along on a transfer deck 101.

Two grooves 102 are formed on the upper surface of the transfer deck 101 into which the magnetic tape 16 bonded to the lower surface of the tape-adhering overlay 8 are inserted. In addition, a clamp hook 103 is provided at a lateral edge of the transfer deck 101. The clamp hook 103 is opened or closed by a pneumatic cylinder 104 to positively clamp the tape-adhering overlay 8 and material plate 35C.

Above the transfer deck 101 is provided a ultrasonic welder device 108 which is a second temporary welding means and so constituted as to move a movable frame 106 equipped with a plurality of ultrasonic welding heads 105 up and down by a pneumatic cylinder 107. Accordingly, the tape-adhered overlay 8 is spot-welded to the material plate 35C here by the ultrasonic welder device 108.

In positioning the material plate 35C on the tape-adhering overlay 8, it is so arranged that a register mark formed in advance on the lower surface of the material plate 35C is detected by an optical sensor (not shown), whereby the material plate 35C is corrected in position and attitude by an attitude correcting function of the carrie 93.

As described hereinabove, in the core material feed mechanism 3, strips of the material plates 35c each including two rows of units of cores 36 are temporarily welded in columns in the transfer direction onto the upper surface of the tape-adhering overlay 8 intermittently transferred along the line 1 which are in turn sent to a succeeding process.

Referring to the overlay overlapping mechanism 4 as shown in FIGS. 3–5, an overlay 111 having the same width as the tape-adhering overlay 8 is introduced from an overlay roller 110 provided over the line 1 through a tension adjusting mechanism 111A to be overlapped onto the upper surface of the overlay 8 sent out from the core material feed mechanism 8, thereby obtaining a continuous magnetic card material 113 having the material plate 35C sandwiched between the tape-adhering overlay 8 and overlay 111. A support arm 111b of the tension adjusting mechanism 111A is rotatably supported at the center in an elongated direction thereof, and interlockingly coupled to a pneumatic rotary actuator (not shown). The support arm 111b has rollers 111a and 111a held rotatably at opposite ends thereof. By controlling the air pressure of the actuator, the overlay 111 can be applied a predetermined tension.

A pair of upper and lower stainless steel belts 114 and 115 are wound around a belt conveyor 116 of the laminating mechanism 5. The stainless steel belts 114 and 115 have mirror finished outer surfaces. The above-described continuous card material 113 is grasped and transferred between the belts 114 and 115. A plurality of pressers 117 which can be independently operated by a hydraulic cylinder are arranged in parallel along the linear transfer route of the belt conveyor 116, so that the magnetic card material 113 sandwiched between the belts 114 and 115 is integrally pressed by the pressers 117. Since each presser is equipped with a function of heat treatment, the material 113 is heated more at its rear portion in the transfer direction. However, the material 113 is cooled at the terminal of the transfer route.

As indicated in FIGS. 14–18, the card cutting mechanism 6 includes an attitude adjusting device 120 which adjusts the attitude of the card material 113, a screw feeder 121 which sends the material card backwards, and a punching press 122 for punching a magnetic card out from the material 113.

The attitude adjusting device 120 mentioned above is provided with a rotary frame 123 an angle of which can be adjusted around a longitudinal axis P4 and a material receptor 124 movable in a transverse direction to the rotary frame 123. The rotary frame 123 in U-shape seen from a front view and supported by a frame member 126 is rotatable by an electric motor 125. The receptor 124 is held by the rotary frame 123 through front and rear slide guides 127, and at the same time, moved in a transverse direction by a screw shaft 129 rotated in a normal or reverse direction by an electric motor 128. The card material 113 is grasped by a pair of up and down hooks of a clamp mechanism 130 provided at four corners of the receptor 124. Therefore, while the card 113 is supported at the four corners by the clamp mechanism 130, the rotating amount and transversal moving amount of the receptor 124 can be adjusted, so that an angle by which the card 113 is fed to the punching press 122 and also the lateral position of the card 113 can be corrected in the attitude adjusting device 120.

The screw feeder 121 is so constituted that a carrier 132 supported by the frame member 126 in a movable manner along a pair of right and left slide guides 131 is moved back and forth by a screw shaft 134 driven in a normal or reverse direction by an electric motor 133. Moreover, the carrier 132 is provided with a fixed receiving element 135 for clipping the right and left ends of the attitude-corrected card material 113 from up and down and a clip member 137 moved up and down by a pneumatic cylinder 136. While the card material 113 is caught by the fixed receiving piece 135 and clip member 137, it is further transferred to the punching press 122 by an intermittent movement of the carrier 132.

The punching press 122 has a pair of punching molds 140 mounted at a lower end of a ram 139 which is driven reciprocally in a vertical direction by a hydraulic cylinder 138. Every two sheets of magnetic cards are punched out by the punching press 122 from the card material 113 intermittently received from the screw feeder 121.

The magnetic card obtained in the above-described manner is forwarded to a process for post-treatment. After a quality test of the magnetic tape or appearance inspection, the magnetic card is marked with a seal or attached with a label to be a finished product.

The continuous band of the card material 113 is arranged to be deflected between the material feed mechanism 3 and laminating mechanism 5, and between the laminating mechanism 5 and cutting mechanism 6, so that the processing timing lag between the mechanisms can be absorbed.

The present invention is not restricted to such one series of system comprising the overlay overlapping mechanism 4, laminating mechanism 5 and card cutting mechanism 6 as described hereinabove, but may be arranged, for example, such that the layered material sheets 35A and 35B are overlapped with the tape-adhering overlay 8 in the positioned state and temporarily welded, and then cut into a predetermined size, or wound around a roll without being cut. That is, the arrangement may be designed as a magnetic card manufacturing apparatus by itself for pre-treatment.

Furthermore, the magnetic card manufacturing arrangement of the present invention makes it automatic to position and overlap material sheets for a front and a rear surfaces of the magnetic card to be a material plate, and moreover, the overlapped material plate and a tape-adhering overlay. Therefore, it is enough only to set the material sheets for the magnetic card in the accommodating unit, whereby the material sheets can be positioned and overlapped effectively and accurately, achieving a high yield and improving productivity of magnetic cards.

By the magnetic card manufacturing apparatus of the present invention, a composite body made of the overlapped material sheets and the tape-adhering overlay is rendered small in width. Accordingly, the facilities necessary for laminating process and cutting process of the composite in the post-treatment can be compact in size, making the manufacturing system advantageously simple in structure.

Although the core is a double-layered structure in the foregoing description, a single- or triple- or more layered structure is employable.

Since all tasks can be carried out in series relative to the front overlay along the transfer line, i.e., bonding of a magnetic tape, supply of a core material, supply and overlapping of a rear overlay, laminating process and cutting process, it becomes possible to manufacture the magnetic cards with high efficiency with saving the labor.

In addition, the overlay itself is used as a transfer medium for transferring the other materials in the present invention, and therefore, the manufacturing arrangement is rendered relatively simple in structure and compact in size as compared with the case when only the manual operation is automatized in the conventional arrangement.

A modification of the laminating mechanism 5 will be described hereinbelow.

In the magnetic card manufacturing system of FIGS. 3 and 4, the overlapping mechanism 4 is so constituted that the rear overlay having the same width as the front overlay and sent from the overlay roller 110 through the tension adjusting mechanism 111A are supplied to be overlapped on the upper surface of the front overlay fed from the core material feed mechanism 3, as shown in FIG. 4.

The front overlay to which is temporarily welded the material plate is overlapped with the rear overlay thereon, and supplied to the laminating mechanism 5.

Figure 19:
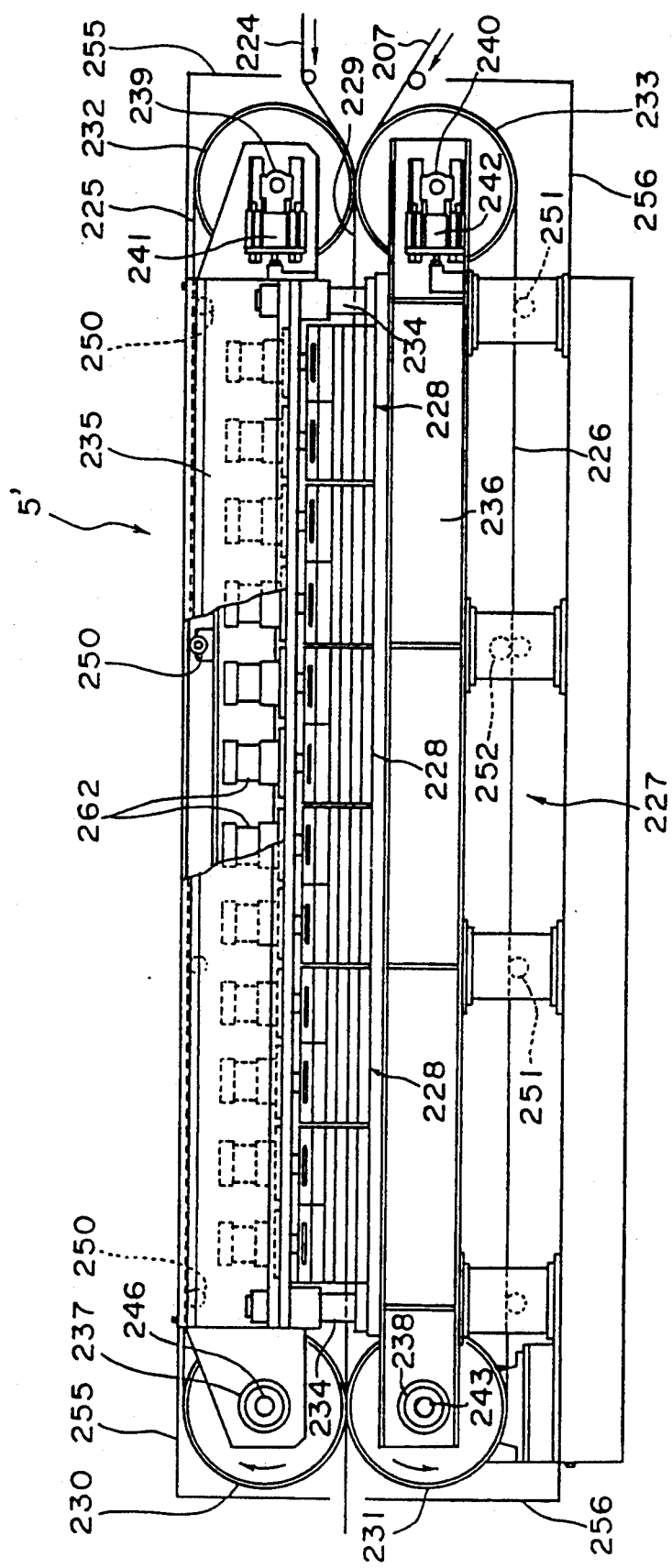
Figure 20:
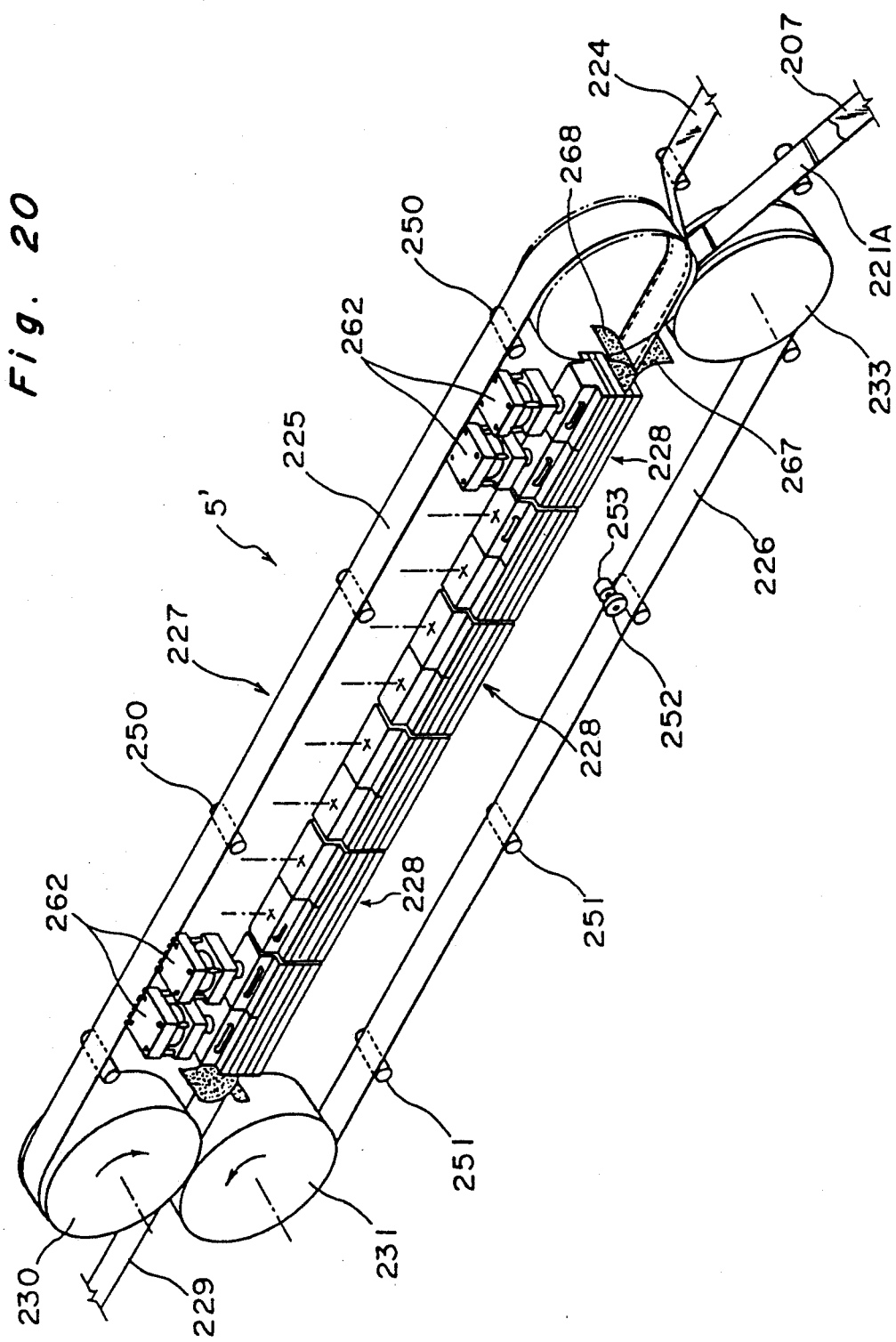
Figure 21:
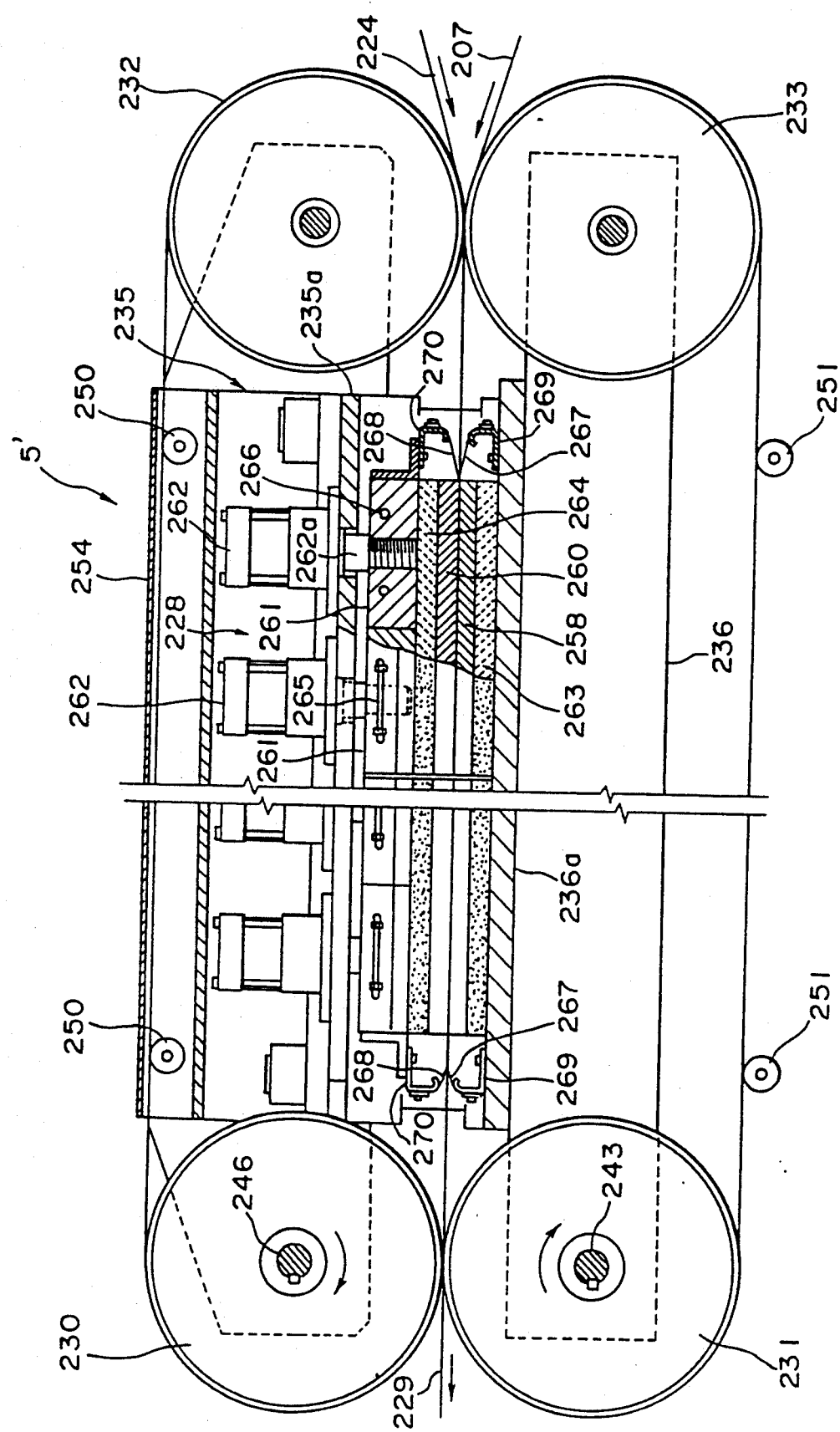

A laminating device 5' which is a modified example of the laminating mechanism 5 is, as indicated in a partially-removed front elevational view, a partially-abbreviated perspective view and a partial enlarged sectional view of FIGS. 19-21, provided with a belt conveyor 227 having a pair of endless stainless steel belts 225 and 226 wound in such manner that the respective mirror-finished outer surfaces of the belts are opposed to each other, and six couples of press mechanisms 228 approximately in tight contact with each other in parallel to the transfer direction of the linear route of the belts 225 and 226. A continuous band-shaped card material 229 which has a material plate 221A sandwiched between upper and lower overlays 224 and 207 is grasped and intermittently transferred between the belts 225 and 226, when the card material 229 is integrally pressed every unit of one sheet of the material plate 221A between the belts 225 and 226 by heat of the press mechanisms 228.

The stainless belts 225 and 226 constituting the belt conveyor 227 are stretched and extended between a driving pulley 230 in the rear of the transfer route and a tension pulley 232 in the front thereof, and between a driving pulley 231 and a tension pulley 233, respectively.

An upper frame 235 and a lower frame 236 coupled by right and left stays 234 have the driving pulleys 230 and 231 held through a pair of right and left bearings 237 and 238 in the rear ends thereof, and the tension pulleys 232 and 233 supported through a pair of right and left bearing brackets 239 and 240 in the front ends.

The bearing bracket 239 or 240 which is slidable back and forth is interlocked to a pneumatic cylinder or an oil pressure cylinder 241 or 242. Because of the pneumatic cylinder, a predetermined pressure is added to the bearing bracket 239 or 240 to displace in a direction away from the driving pulley 230 or 231. Accordingly, an elongation of the metallic belts 225 and 226 during use is absorbed so that the belts 225 and 226 are stretched with a predetermined tension at all times.

Figure 22A:
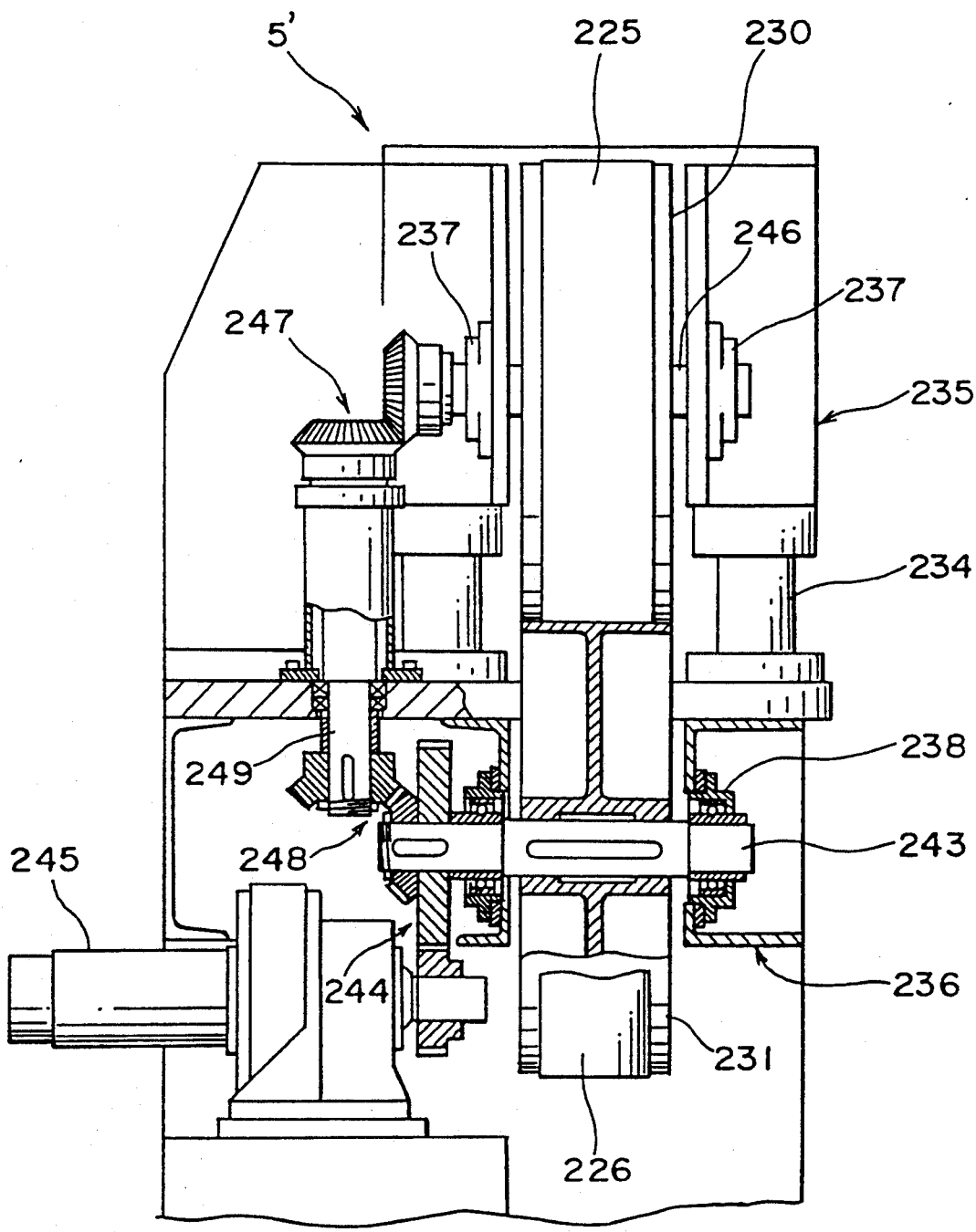
FIG. 22(A) is a cross sectional view of a belt driving section.
Figure 22B:
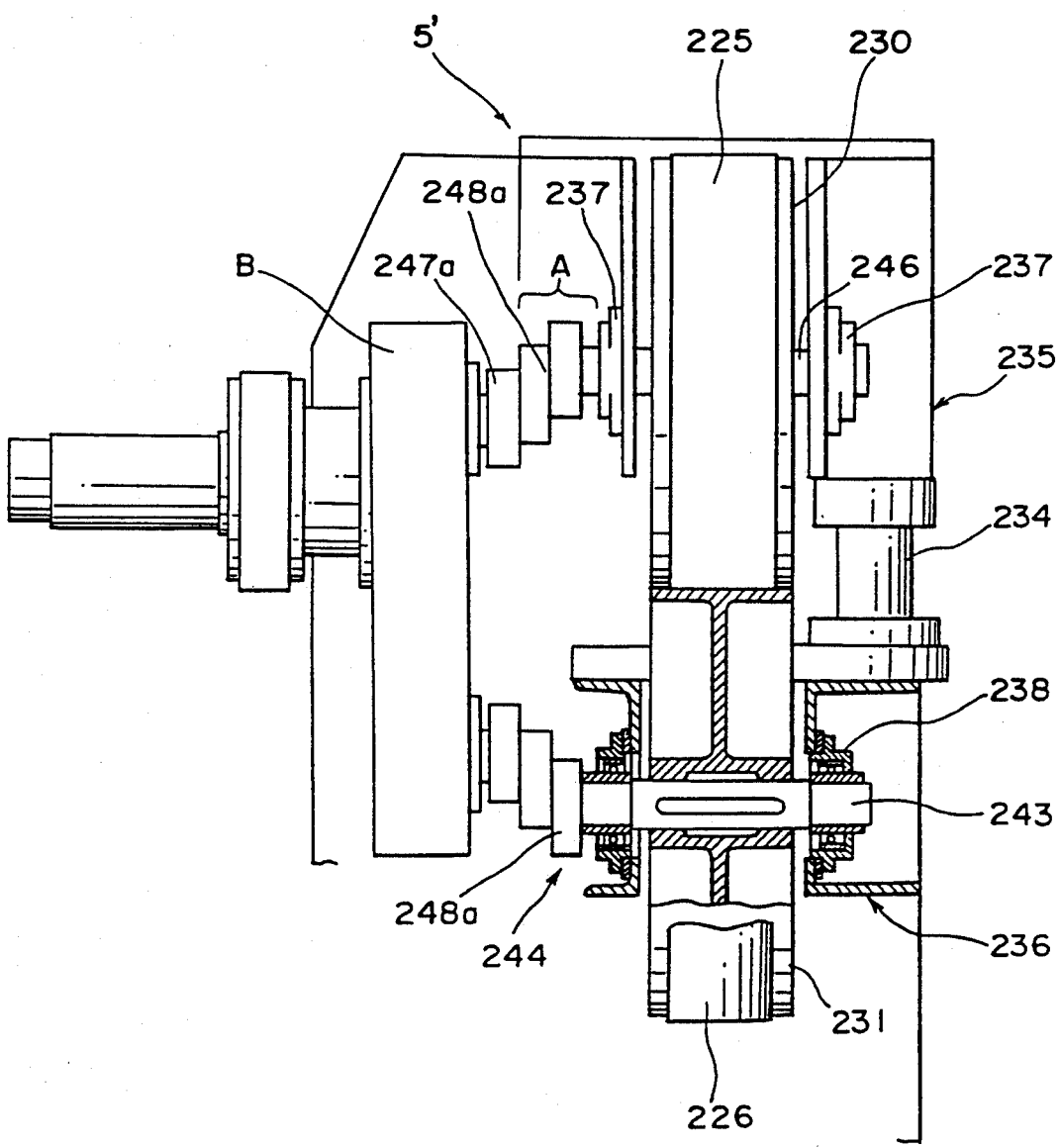
FIG. 22(B) is a similar view to FIG. 22(A), showing a modification of the belt driving section.

As shown in a side sectional view of FIG. 22, a main shaft 243 of the lower driving pulley 231 is, through a gear reduction mechanism 244, interlocked with an AC servo motor 245, and at the same time, the main shaft 243 is interlocked with a main shaft 246 of the upper driving pulley 230 through two pairs of upper and lower bevel gear transmission mechanisms 247 and 248 and a longitudinal shaft 249, as shown in FIG. 22(A). The driving pulleys 230 and 231 are thus driven in a synchronous manner in an opposite direction. FIG. 22(B) shows a modification of FIG. 22(A), wherein there provide a schmidt coupling and a gear box transmission mechanism 247a, and 248a in place of the mechanism 247 and 248.

In order to prevent that the metallic belt 225 or 226 hangs down, carrier rollers 250 or 251 are provided at the side where the belt 225 or 226 is not pressed. A rotary encoder 253 rotated through a rubber roller 252 in touch with an inner surface of the metallic belt 226 is provided at the not-pressed side of the lower belt 226 to measure the actual moving amount of the belt thereby to control the rotating amount of the AC servo motor 247.

A covering plate 254 is mounted in the upper frame 235 so as to cover above the transfer route at the not-pressed side of the upper belt 225. Moreover, protective casings 255 and 256 provided at front and rear ends of the belt conveyor 227 cover around an outer periphery of the tension pulleys 232 and 233 and driving pulleys 230 and 231. Therefore, even when the metallic belt 225 and 226 is unexpectedly cut, it is prevented that the belt 225 or 226 jumps out of the device because of its own elasticity, assuring safety in operation of the device.

Figure 23:
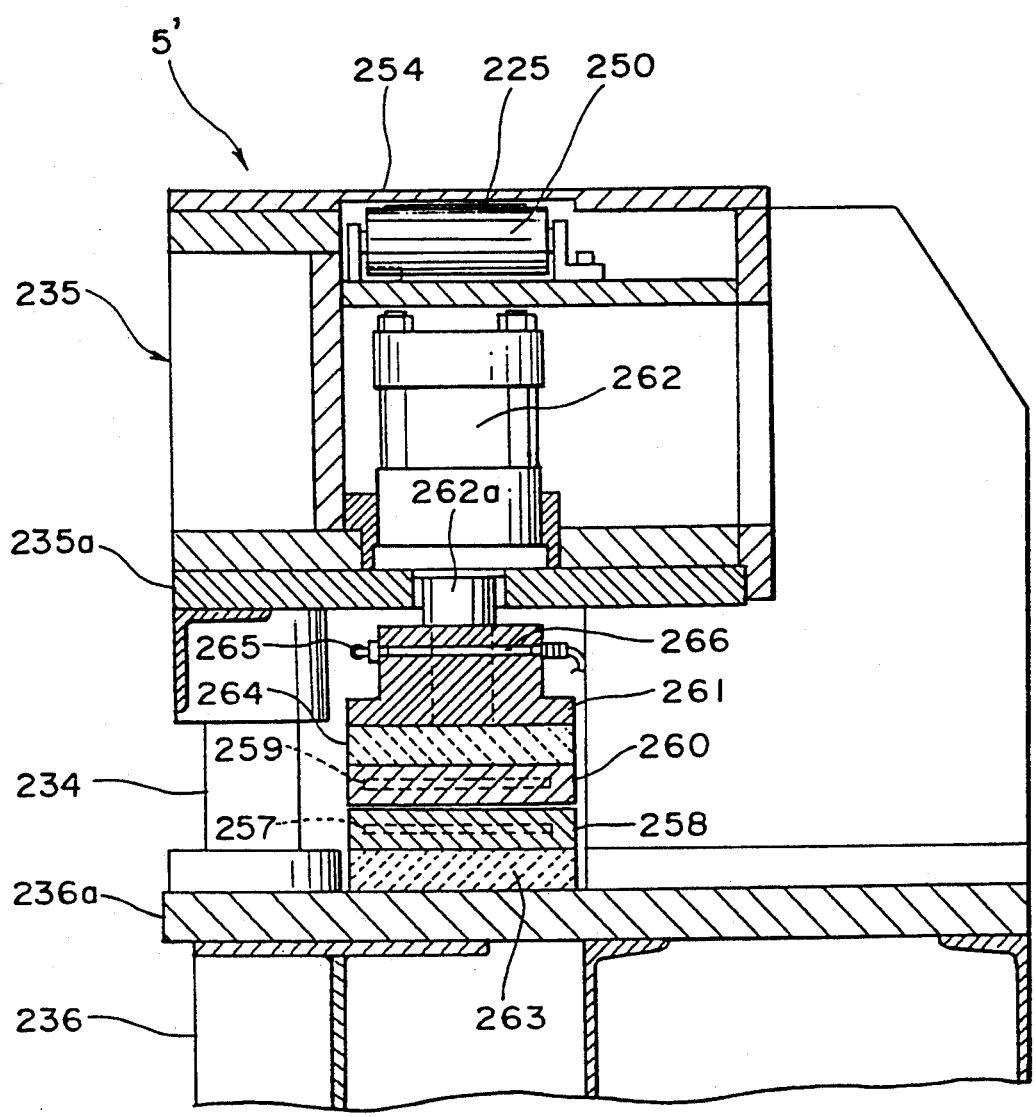

As indicated in a sectional view of FIG. 21 and a side sectional view of FIG. 23, the press mechanism 228 is comprised of a lower pressuring plate 258, an upper pressuring plate 260, a pair of front and rear pressuring blocks 261 and 261, and a pair of front and rear hydraulic cylinders 262 and 262 for pressing the pressuring blocks downwards. The lower pressuring plate 258 has a heater 257 embedded thereinside and is provided in an inner periphery of the lower metallic belt 226, while the upper pressuring plate 260 has a heater 259 buried thereinside and is provided in an inner periphery of the upper metallic belt 225.

The lower pressuring plate 258 is mounted on a roof panel 236a of the lower frame 236 through a heat insulating plate 263. Thee is also provided a heat insulating plate 264 between the upper pressuring plate 260 and the pressuring block 261. The heating temperature can be stably maintained by restricting the radiation of heat from the pressuring plates 260 and 258.

The hydraulic cylinder 262 is mounted on a bottom plate 235a of the upper frame 235, with a piston rod 262a thereof screwed with the pressuring block 261. A pair of front and rear cooling water passages 266 are formed in each pressuring block 261, which is communicated each other by an outer piping 265 in U-shape. The pressuring block 261 can be accordingly cooled by the cooling water flowing in the passage 266, thereby restricting the change in an internal pressure resulting from an expansion of the operating oil in the hydraulic cylinder 262, with preventing the deterioration of packings for the operating oil and hydraulic cylinder.

In the transfer route of the belt conveyor 227 shown in FIG. 21, there are intervened heat-proof resin sheets 267 and 268 each made of fluoric resin such as Teflon (trademark registered by Du Pont) or the like between the lower pressuring plate 258 and the lower metallic belt 226, and between the upper pressuring plate 260 and the upper metallic belt 225, whereby a uniform pressuring force is added to the material plate 221A from the upper and lower pressuring plates 258 and 260.

Figure 24B:
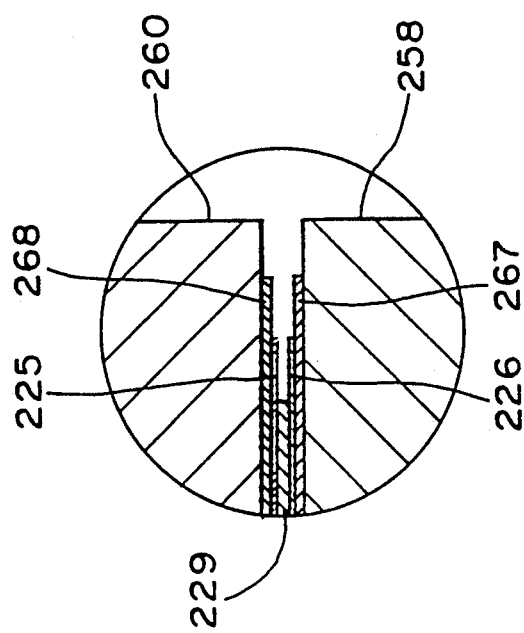
FIG. 24(b) is an enlarged view of a portion P in FIG. 24(a)
Figure 24A:
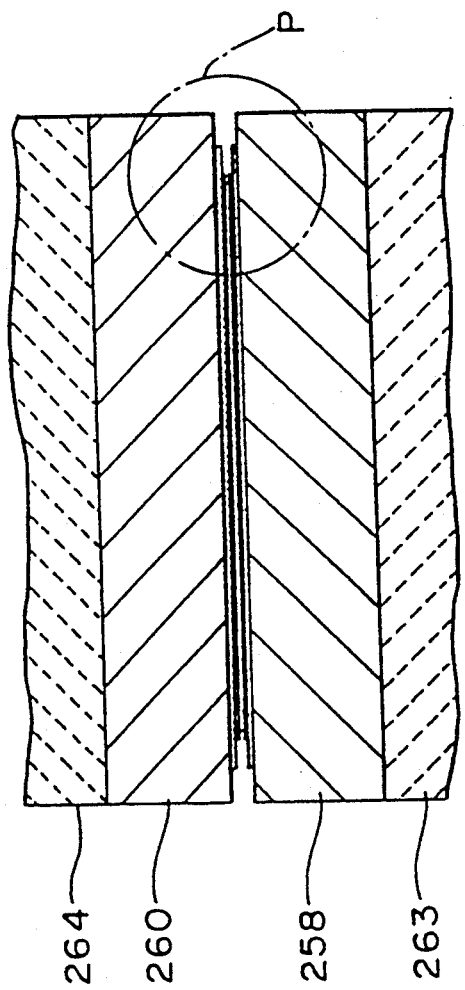
FIG. 24(a) is a cross sectional view where the press mechanism operates.

The pressure uniforming resin sheet 267 or 268 is, as is best understood from a cross sectional view of FIG. 24, a continuous band extending all over the pressing range of the pressuring plates 258 and 260, having a larger width than the metallic belts 225 and 226. The front and rear ends of the resin sheets are fixed to the roof panel 236a of the lower frame 236 and the pressuring block 261 through coupling metal fittings 269 and 270, respectively. In the construction as above, the resin sheets 267 and 268 can be easily detached if the pressuring plates 260 are raised.

In the laminating device 5' having the above-described construction, the card material 229 is sequentially pressed every unit of the material plate 221A by the six heating presser mechanisms in accordance with the transfer thereof by the belt conveyor 227 at a constant pitch, so that the front and rear overlays 207 and 224 and the material plate 221A are perfectly united.

Figure 25:
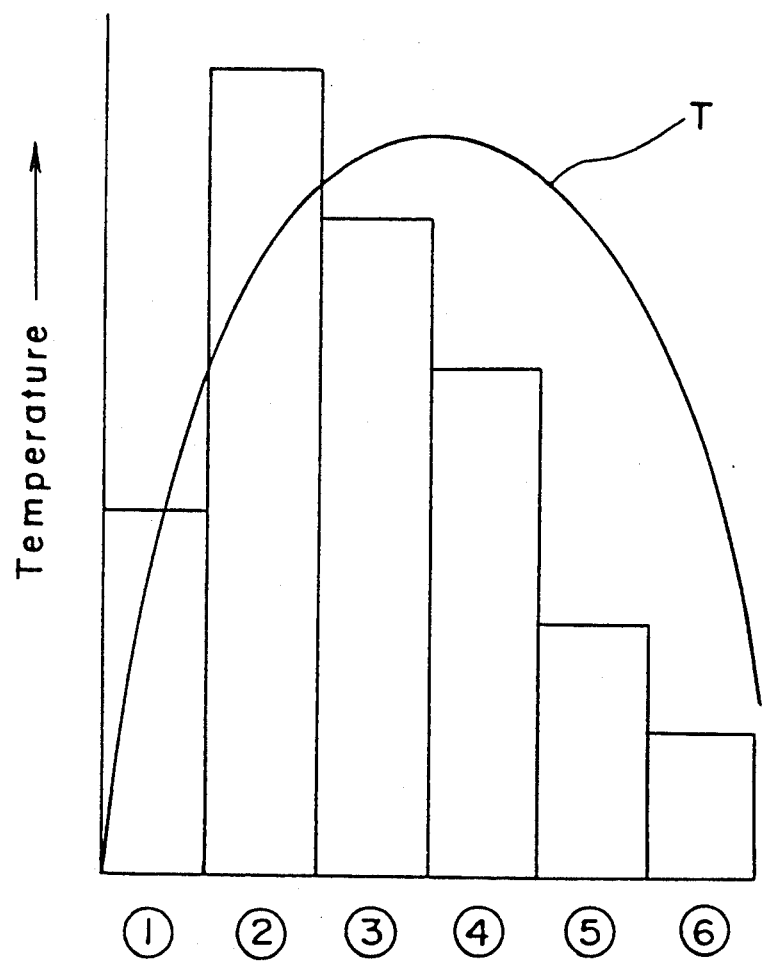
Figure 26:
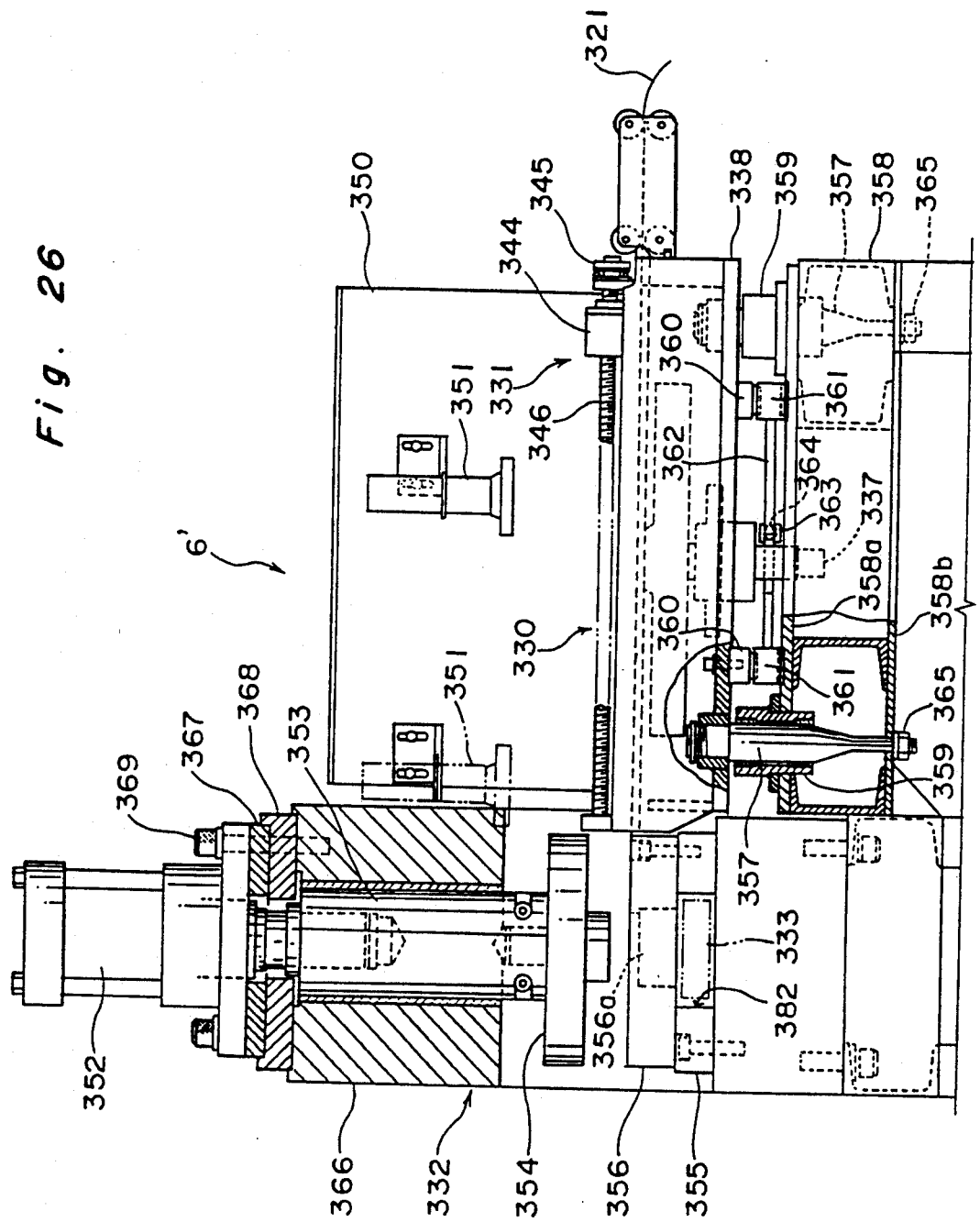
Figure 27:
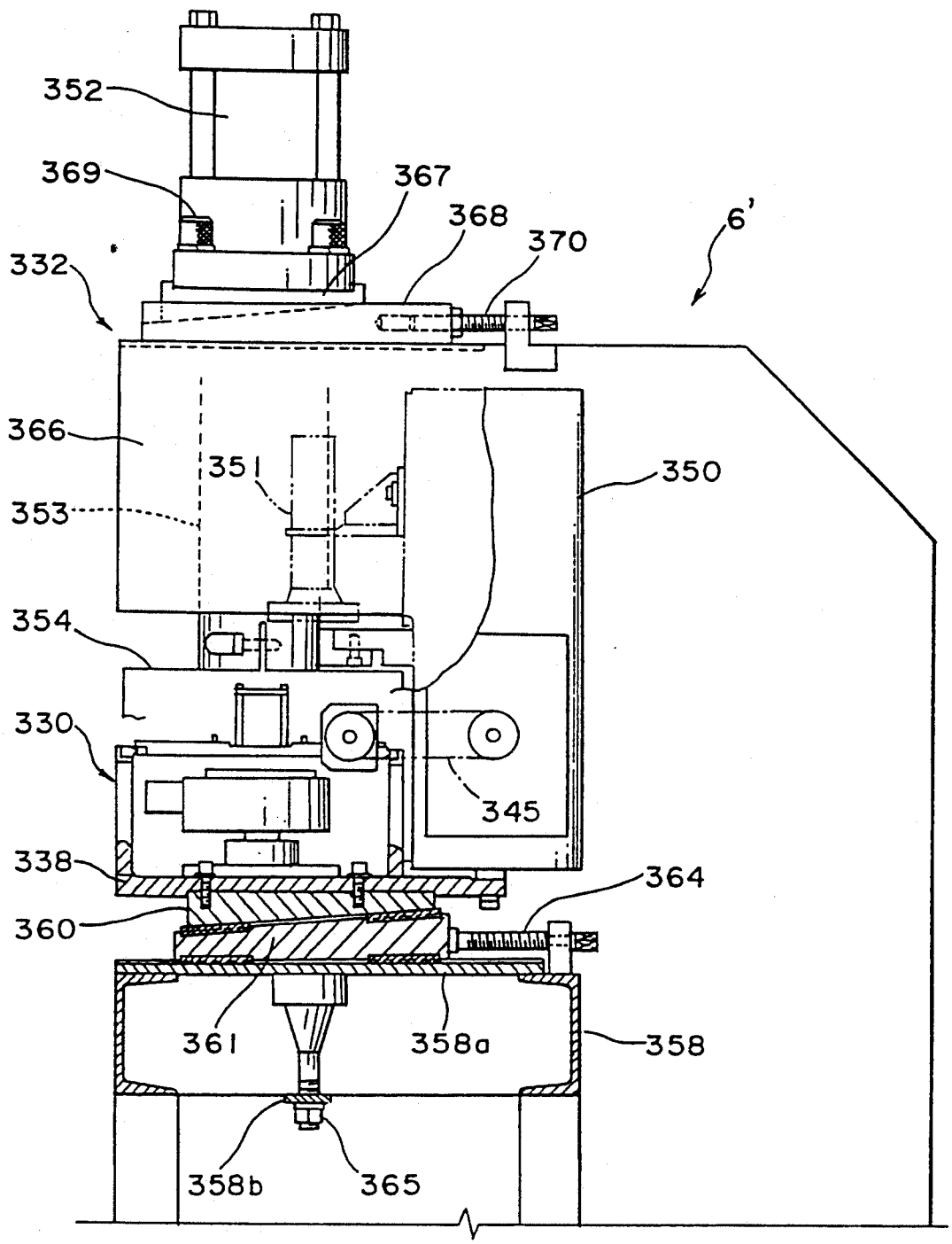
Figure 28:
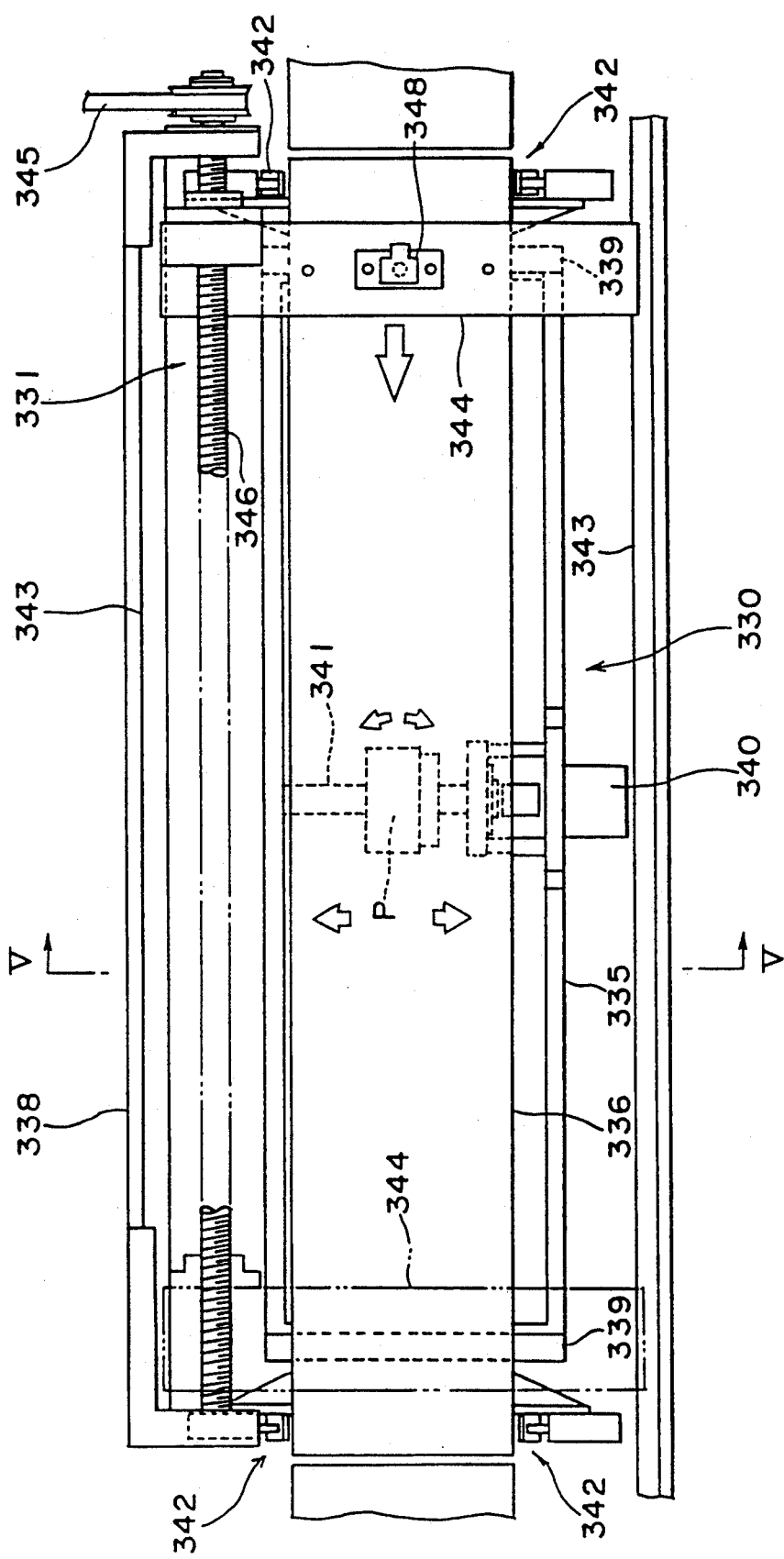
Figure 29:
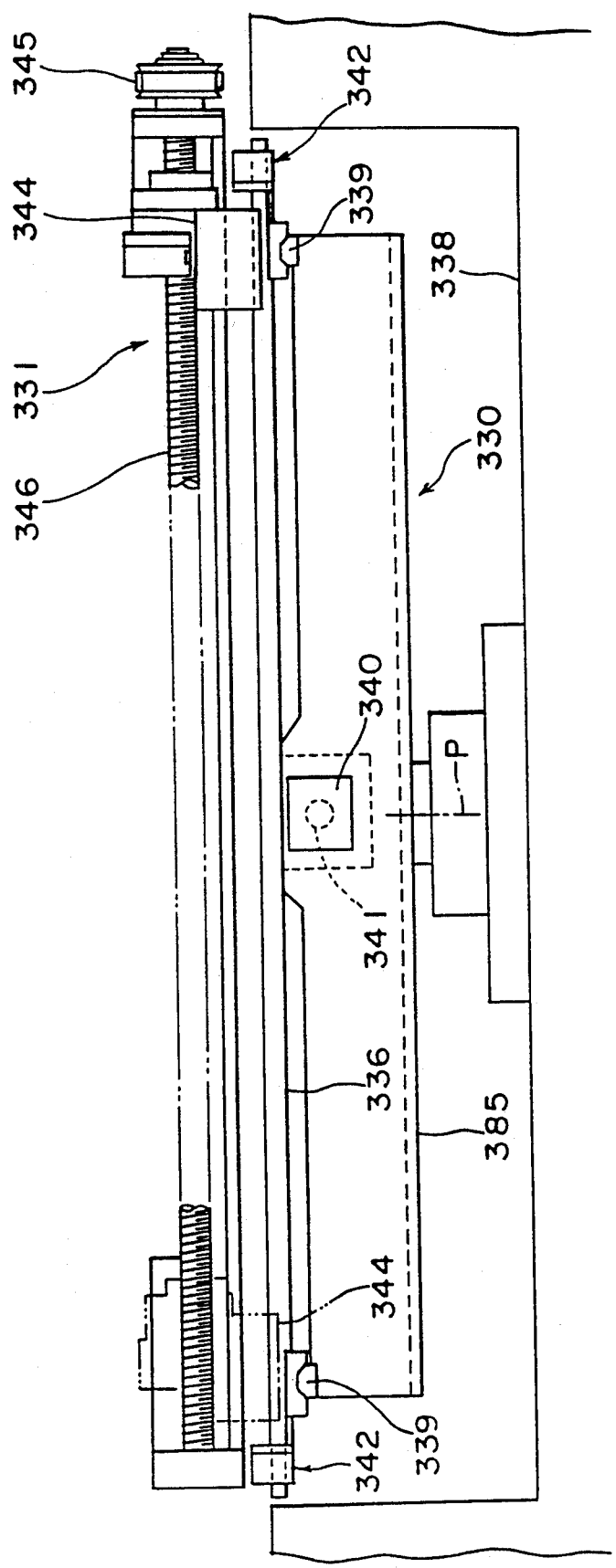
Figure 30:
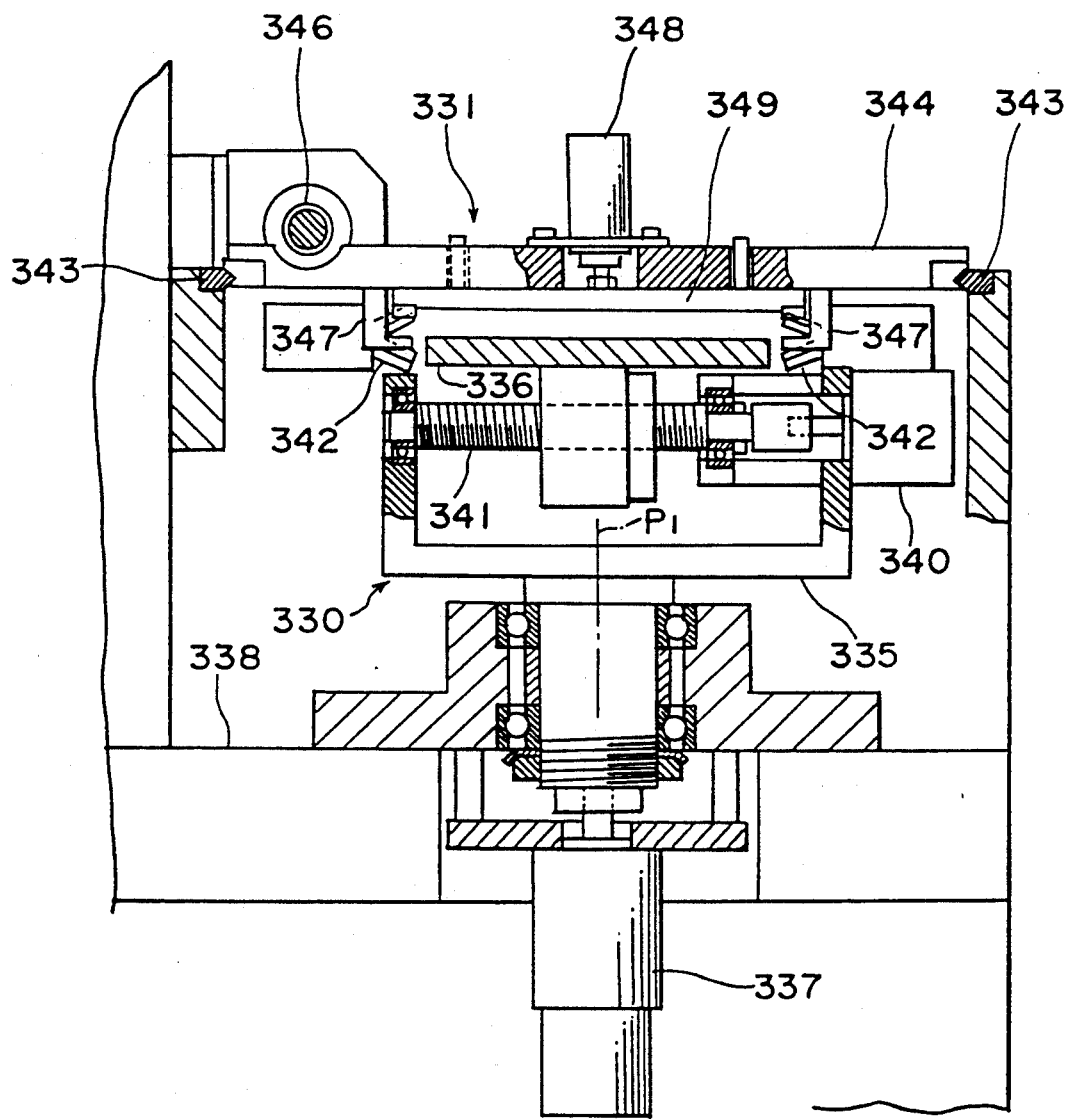

The heating temperature is set individually for each pressuring plate 258 or 260. For example, as indicated in a graph of FIG. 25, the pressuring plates 258 and 260 at a first stage preheat (indicated by 1), and the pressuring plates at a second stage heat with the highest temperature (indicated by 2), and the plates at a third stage heat with a lower temperature than at the second stage (indicated by 3). The pressuring plates 258 and 260 at a fourth stage heat with a lower temperature than at the third stage (indicated by 4). However, the heating temperature by the plates at the fourth stage is set higher than the preheating temperature of the plates at the first stage. Further, the heating temperature is rendered lower sequentially from a fifth stage to a sixth stage (indicated respectively by 5 and 6). The heating temperature at the fifth and sixth stages is lower than the preheating temperature a the first stage, but higher than the normal temperature, whereby the card material is cooled. The heating temperature is controlled such that the temperature T of the card material 229 is changed in a parabolic pattern as a whole. Accordingly, the heating condition can be obtained as desired in correspondence to the characteristic or quality of the material of the card material 229.

Besides the heating temperature, the pressuring force of the hydraulic cylinder 262 for each press mechanism 228 is also individually controllable. Therefore, by adjusting the pressuring force together with the heating temperature, the change of the temperature T of the card material 229 can be controlled more suitable.

During the constant feed of the belt conveyor 227, the hydraulic pressure of each cylinder 262 is so reduced as to maintain the metallic belts 225 and 226 in face-to-face contact with the opposite surfaces of the card material 229, thereby to prevent the air from entering between the belts 225 and 226, and the card material 229. Moreover, the resin sheets 267 and 268 can reduce the sliding resistance from the metallic belts 225 and 226 which can accordingly move smoothly.

After the card material 229 is integrally formed by the heating press in the foregoing manner, the material 229 is sent into the card cutting mechanism 6. As the card material 229 is sequentially transferred a pitch of a core unit by an intermittent screw mechanism 271, it is punched every two, right and left, sheets by the action of punching press mechanism 272 using a hydraulic cylinder. As a result, the magnetic card A is obtained.

In the above-described embodiment, the resin sheets 267 and 268 are formed in a continuous band-like shape all over the length of the pressuring plates 258 and 260, without a boundary at a sliding portion with the metallic belts 225 and 226. Therefore, the metallic belts 225 and 226 can be more smoothly moved. At the same time, exchange of the resin sheets 267 and 268 can easily be performed. It may be possible to attach the resin sheets 267 and 268 to each pressuring surface of the pressuring plates 258 and 260.

Although it may be considered that the resin sheets 267 and 268 are bonded by an adhesive to the whole inner surface of the metallic belts 225 and 226, in this case, it is impossible to exchange the resin sheets 267 and 268 solely. If the resin sheets are broken, not only the sheets but the metallic belts 225 and 226 should be exchanged. This is not practical.

The press mechanism 228 is not restricted to that discussed in the above embodiment, but may be any so long as it consists of a plurality of pressers.

In the laminating device for manufacturing ID cards as is described hereinabove, because the unevenness of thickness of metallic belts, errors in the planeness and parallelism of each pressuring plate can be absorbed by the resin sheets, an accuracy in processing and assembling the metallic belts and pressuring plates is not particularly required so high. Therefore, the processing and assembling cost of the mechanism can be reduced, thereby to provide the device at a reasonable price.

Since the metallic belts are not brought in direct sliding contact with the pressuring plates, an abrasion of the belts and plates is suppressed, with improving the durability and simplifying the maintenance thereof.

Moreover, the generation of abrasion is limited only in the resin sheets, and accordingly it is not necessary to exchange the metallic belts or press mechanism. Because an exchange of the resin sheets only is relatively simple, it does not interrupt the manufacture of ID cards for so long time, without lowering the productivity.

A modified example of the card cutting mechanism 6 will be described with reference to FIGS. 26-33.

Each press mechanism 228 in the laminating device 5' described earlier is equipped with a function of heat treatment, thereby heating and pressing the card material 229 grasped between the upper and lower belts 225 and 226. In the laminating device, it is so arranged that the card material 229 is heated at a higher temperature as it goes rearwards of the transfer direction, and cooled at the terminal of the transfer, to be sent to the cutting mechanism 6.

A modified cutting device 6' shown in FIGS. 26-33 includes an attitude adjusting means 330 for adjusting the attitude of a card material 321, a screw feeder means 331 for transferring the card material 321 backwards, a punching press 332 as a punching means to obtain units (a) of cores from the card material 321, a card conveyor 333 which transfers punched ID cards 375 in a horizontal direction, and a take-out mechanism 334 which aligns the ID cards 375 in a standing posture to be taken out in an overlapping state.

The attitude adjusting means 330 is provided with a 33rd positioning means, namely, a rotary frame 335 an angle of which can be adjusted about the longitudinal axis P1 and a material receptor 336 as a 32nd positioning means which is movable laterally in a direction orthogonal to the transfer direction of the card material 321.

The rotary frame 335 formed in U shape seen from the front view is supported by a frame member 338 so that it is rotatable by an electric motor 337. The material receptor 336 is held by the rotary frame 335 through a pair of front and rear slide guides 339, and movable in the transfer direction of the card material 321 by a screw shaft 341 which is rotated in a normal or reverse direction by an electric motor 340.

The card material 321 is grasped by a pair of upper and lower hooks provided at each corner of the receptor 336. While the card material 321 is grasped at four points by the clamp mechanism 342, the rotating amount and the lateral moving amount of the receptor 336 are adjusted, whereby the card material 321 is adjusted with the angle and lateral position when it is fed to the punching press 332.

In the screw feeder means 331, a carrier 344 held by the frame member 338 in a movable manner in a back-and-forth direction along the slide guides 343 is moved by a screw shaft 346 driven in a normal or reverse direction through a transmission belt 345. The carrier 344 has a fixed receiving element 347 which supports the right and left ends of the card material 321 from up and down, and a clip member 349 which is driven reciprocally in a vertical direction by a pneumatic cylinder 348. While the card material 321 is grasped by the fixed receiving element 347 and clip member 349, it is intermittently screwed to the punching press 332. A 31st positioning means works to adjust the grasping position of the card material 321 by the carrier 344 so that the position of the card material 321 in the transfer direction is corrected.

When the position of the card material 321 is to be detected, a positioning mark at an upper surface of the card material 321 is supervised by a pair of front and rear CCD cameras 351 mounted in the lateral face of a control box 350 having a driving motor of the screw feeder means 331, etc. accommodated therein. The position and angle of the card material 321 is hence controlled on the basis of the image data obtained by the CCD cameras 351.

The punching press 332 is comprised of a ram 353 driven in a vertical direction by a hydraulic cylinder 352, a punching mold 354 mounted at the lower end of the ram 353, and a lower mold 356 provided in a mold support 355. The card material 321 intermittently sent from the feeder means 331 is punched out by the punching press 332 every two sheets of ID cards.

A peripheral edge portion of a punching hole 356(356a) in the lower mold 356 shows wear during the use, and therefore it becomes necessary to grind the upper surface of the lower mold 356 regularly. However, if and after the upper surface of the lower mold 356 is ground, an upper surface of the punching hole 356(356a) is turned lower in height than the upper surface of the receptor 336, with enlarging the distance from the punching mold 354. Therefore, the whole of the attitude adjusting means 330 and the hydraulic cylinder 352 are arranged to be adjusted in a vertical direction as follows.

Specifically, there are provided a pair of front and rear guide shafts 357 projecting downwards from the lower surface of the frame 338 of the adjusting means 330, which shafts 357 pass through a boss 359 provided in an upper frame portion 358a of a fixed underframe 358 to be slidable in a vertical direction. There are further intervened a movable block 361 in a reversed tapered configuration between a tapered block 360 fixed at the front and rear two points of the lower surface of the frame member 338 and the upper surface of the upper frame portion 358a. If the movable block 361 is screwed right and left, the frame member 338 is adjusted in a vertical direction while maintaining its parallelism. The front and rear movable blocks 361 are integrally coupled by a coupling member 362. Therefore, when an adjusting bolt 364 which is so supported by the fixed underframe 358 as to be immovable in a lateral direction is screwed to a boss 363 provided at the longitudinal center of the coupling member 362, and the adjusting bolt 364 is rotated, the movable blocks 361 can be simultaneously moved. Accordingly, while the frame 338 is vertically adjusted, if a nut 365 fitted in the lower end of the guide shaft 357 is tightened to butt against the lower surface of the frame portion 358a, the frame member 338 is rigidly fixed.

The hydraulic cylinder 352 of the punching press 332 is tightly secured by a bolt 369 through a tapered spacer 367 fixed onto a base 366 and a reverse tapered movable spacer 368. The ram 353 is supported vertically slidably by the base 366. By retracting the movable spacer 368 in a lateral direction by an adjusting bolt 370 screwed thereto, the hydraulic cylinder 352 is adjusted in a vertical direction while it maintains the parallelism.

Figure 31:
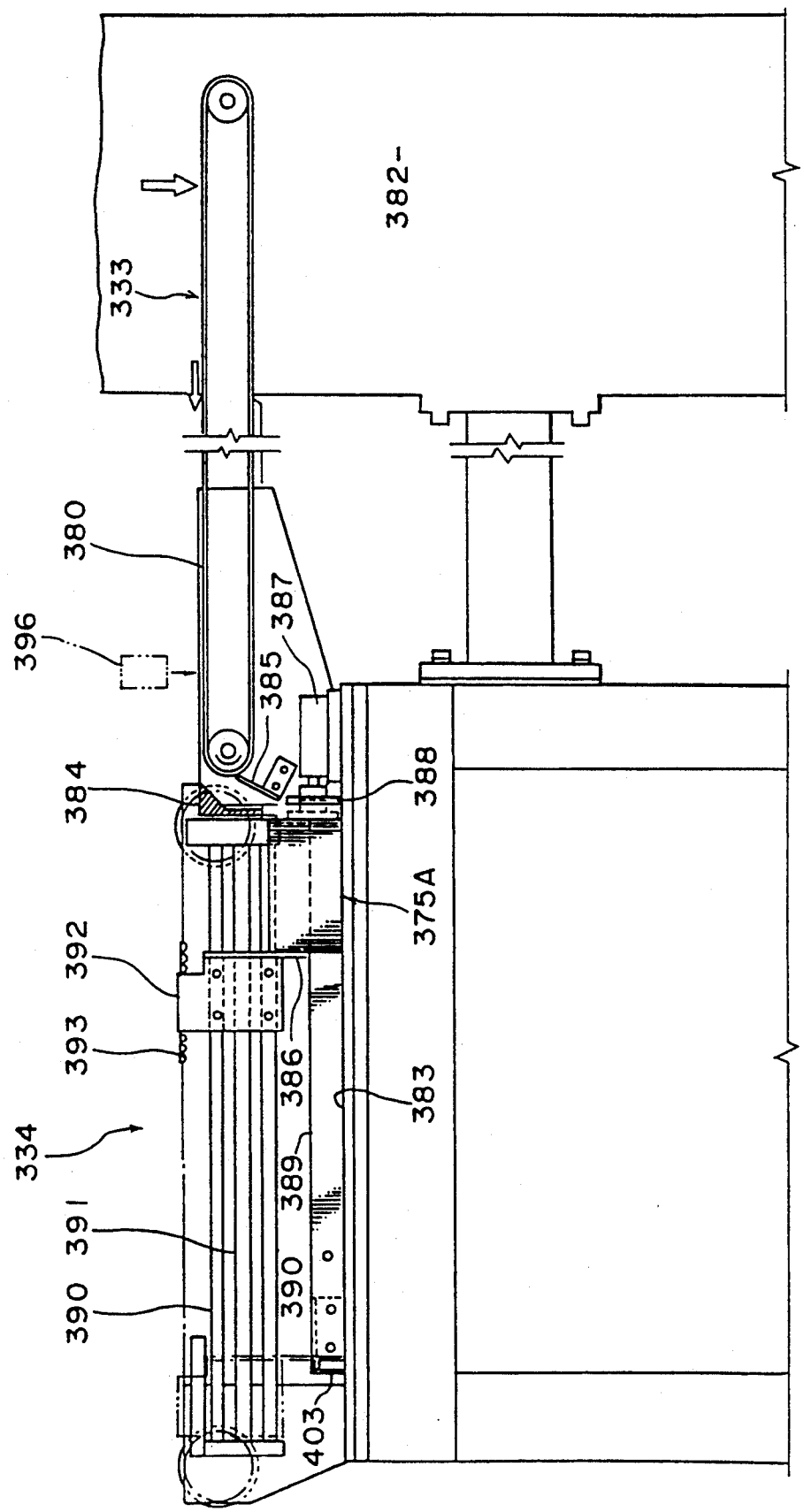
Figure 32:
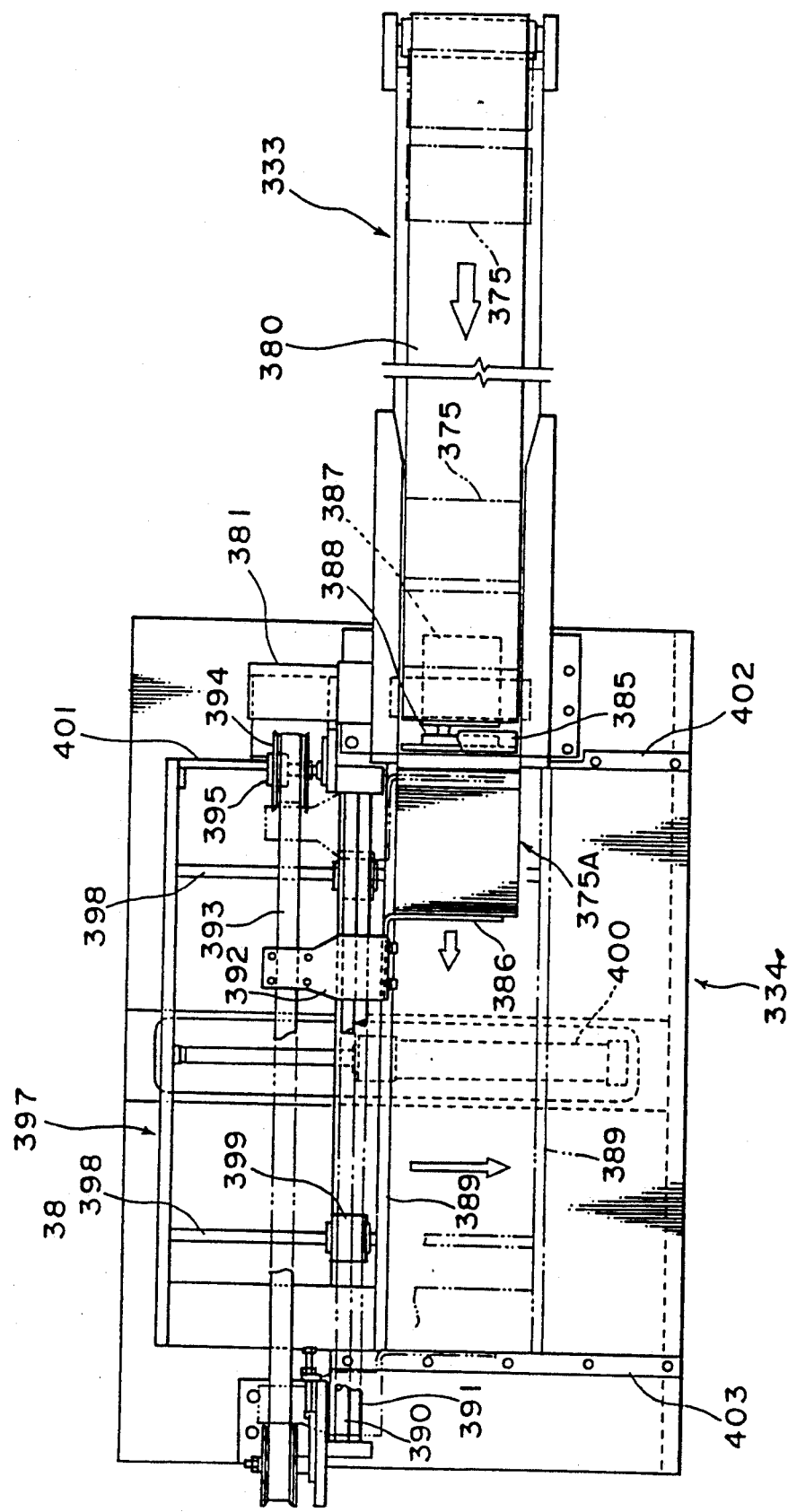
Figure 33:
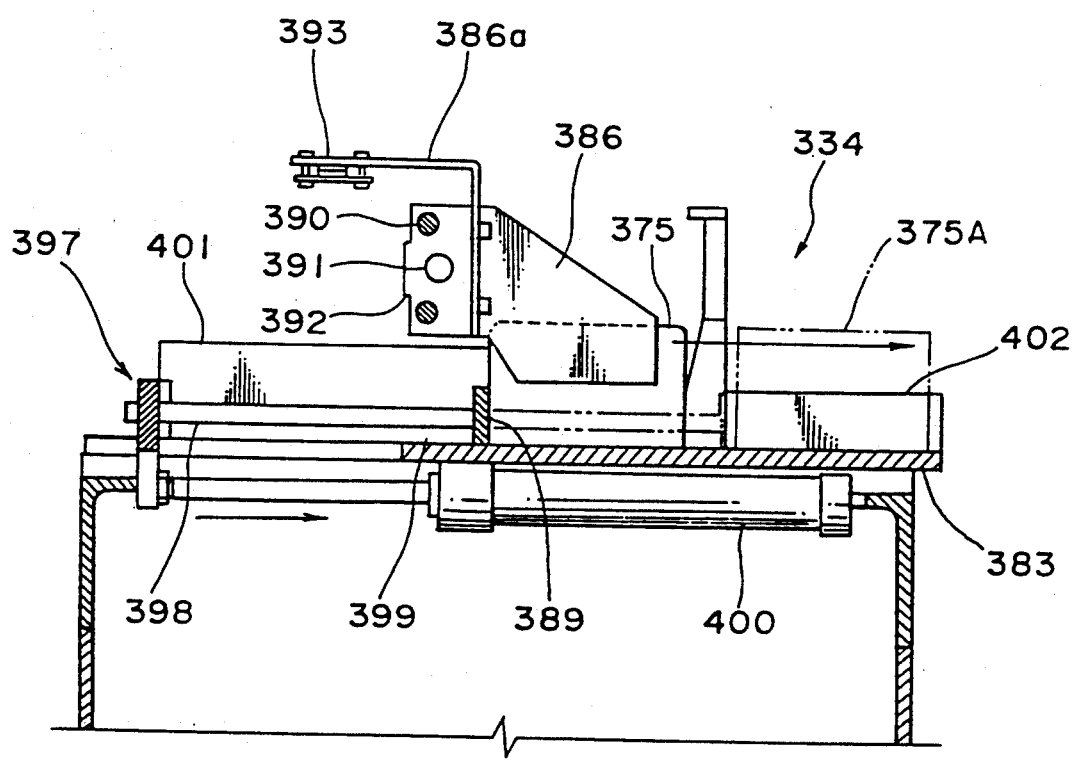

Referring to FIGS. 31–33, the card discharge conveyor 333 and take-out mechanism 334 will be discussed in detail.

A flat belt 380 of the card discharge conveyor 333 is supported horizontally and driven by a motor 381. A front end of the flat belt 380 enters a hollow section 382 formed in the mold support 355 of the punching press 332 so as to receive the punched ID card 375 and send the same sideways.

The card take-out mechanism 334 is provided with a front and a rear guide members 384 and 385 as a guide means to guide the ID card 375 in a standing posture sent from the terminal end of the conveyor 333 onto a receiving stand 383. Moreover, there is provided a support plate 386 which receives the standing ID card 375 placed on the receiving stand 383 from the rear surface thereof. The support plate 386 is rendered movable back and forth. A pneumatic cylinder 387 of a pusher 388 presses the standing ID card 375 from the front surface thereof to send to the support plate 386. Then, a laminated mass of the ID cards 375A received by the support plate 386 is pressed from the lateral side by a press plate 389.

The aforementioned support plate 386 is movable linearly in a horizontal direction along a guide shaft 390, and fitted with a movable bracket 392 driven by a rodless cylinder 391. An arm portion 386a connected to the support plate 386 is coupled to a belt 393 wound in parallel to the guide shaft 390, so that the belt 393 is rotated in accordance with the movement of the support plate 386. A suitable friction resistance is added to a main shaft of a front pulley 394 wound with the belt 393 by a brake 395.

In the above structure, the ID cards 375 supplied one by one from the discharge conveyor 333 are sequentially laminated in a standing posture while receiving a pressure from the pusher 388, whereby the support plate 386 is retracted a distance corresponding to the pressure, with rotating the belt 393. At this time, since the belt 393 is given a suitable resistance by the brake 395, the state of ID cards 375 in tight contact therebetween is not broken.

An optical sensor 396 provided over the terminal end of the conveyor 333 detects a front edge of the ID card 375 in the transfer direction. The pusher 388 is so controlled as to be actuated after a sufficient time from the detection by the optical sensor 396 until the ID card 375 is completely placed onto the receiving stand 383.

The press plate 389 is one side of a ladder-like movable frame 397. Each guide shaft 398 in the front or rear of the movable frame 397 is supported by a bracket 399 on the receiving stand 383 to pass therethrough. At the same time, the guide shafts 398 are moved horizontally by a pneumatic cylinder 400 provided in the lower surface of the receiving stand 383. As indicated by a solid line in FIG. 33, during the lamination of the ID cards, the movable frame 397 is retracted to the lateral side of where the ID cards are laminated. The press plate 389 functions t receive and support the lateral edge of the mass of ID cards 375A. Subsequently, when a predetermined number of sheets of ID cards 375 are laminated, the movable frame 397 is advanced to a position as indicated by a two-dot chain line in FIG. 33, thereby to press the cards 375A to the take-out position in the receiving stand 383.

A side plate 401 defining a front side of the movable frame 397 is adapted to be stopped at a position confronting to the pusher 388 when the ID cards 375A are pressed out, so that a succeeding ID card 375 is supported in a standing posture by the side plate 401 until the support plate 386 is returned.

The support plate 386 is movable in a range between a pair of guides 402 and 403 standing respectively in front of and in the rear of the receiving stand 383. In other words, the laminated ID cards can be taken out 500 sheets at the maximum. The number of laminated sheets of cards is detected by counting the number of detection by the optical sensor 396.

When the ID cards 375A are completely pressed out to the take-out position, the movable bracket 392 is returned by the rodless cylinder 391 and the support plate 386 is accordingly returned to the foremost end. Thereafter, the movable frame 397 is brought back to the initial position, thereby allowing the support plate 386 to receive a small number of ID cards 375 supported by the side plate 401. Then, the ID cards 375 are laminated in order in a standing posture. The ID cards 375 are taken out every predetermined number of sheets by repeating the foregoing procedure.

The cutting device 6' is incorporated into a production line of ID cards in the above-described embodiment. However, the device may be used as an independent device, for example, whereby the continuous card material 321 subjected to the lamination treatment is punched out each core unit (a) thereby to obtain the ID card 375.

Accordingly, as discussed hereinabove, the card cutting device of the present embodiment realizes totally automatic punching of ID cards with stable quality with high positioning accuracy and high efficiency.

Moreover, the cutting device allows the punched ID cards to be aligned and overlapped in order in synchronization with the punching of the ID cards. At the same time, a predetermined number of sheets of ID cards can be taken out easily from the aligned cards, to be effectively sent to a succeeding process, thereby to improve the productivity as a whole.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as included therein.

What is claimed is:

1. A laminating device for use in laminating a continuous ID card material by heating and pressing, the card material being formed of a material plate including a plurality of core units each corresponding to an ID card and sandwiched between a continuous band-shaped heat sealable front overlay which is to form a front surface of an ID card and a continuous band-shaped heat sealable rear overlay which is to form a rear surface of an ID card, said laminating device comprising:

a belt conveyor having a pair of endless stainless steel belts having outer surfaces thereof mirror finished, said belts each running in a path having a straight portion opposed to the corresponding straight portion of the other belt for transferring the card material by grasping the card material from front and back;

at least two pulleys around which each corresponding belt runs, one at each end of the straight path portion of the belt, bearing means in which the respective pulleys are mounted, and a belt tensioning fluid pressure piston-cylinder means connected between bearing means for pulleys at the ends of each straight path portion for urging said pulleys away from each other for maintaining the tension of said endless belts;

drive means connected to one pulley for each belt for intermittently driving the belt a distance corresponding to the pitch of the ID card units along the card material in the direction of movement of the belts along said straight path portions;

a rotary encoder positioned along one of said belts for sensing the distance of movement of the belt and connected to said drive means for controlling said drive means for keeping the amount of movement of said belts equal to the pitch of the ID card units along the card material;

a press mechanism provided in parallel to the direction of movement of each of said belts along said straight path portions of said belts and each having a plurality of pressure plates along an inner peripheral surface of each of said belts and a pressure applying fluid pressure piston-cylinder means connected to each of said pressure plates for urging the corresponding pressure plate toward the corresponding belt for urging the straight path portions of said belt along straight path portions toward the other belt, and having the pressure thereof adjustable independently of the other pressure applying piston-cylinder means for adjusting the pressure on the card material between the straight path portions of the belts, and heating means in each of said pressure plates adjustable independently of the heating means in the other pressure plates for adjusting the temperature on the card material between the straight portions of the belts; and a heat proof resin sheet means of a lubricating-type resin between said pressure plates and the inner surfaces of said belts for making the pressure applied to the card material uniform.

2. A laminating device as claimed in claim 1 in which said resin sheet means is a continuous band between all of the pressure plates corresponding to a belt and the belt.

3. A laminating device as claimed in claim 1 further comprising means for controlling the pressure of said pressure applying piston-cylinder means for reducing the pressure on said pressure plates when said belts are being driven only to an amount which will maintain said belts in contact with the front and rear surfaces of said card material.

* * * * *